Dec. 20, 1949     R. M. HESSERT     2,492,127
DOCUMENT PHOTOGRAPHING MACHINE

Filed Jan. 14, 1943     18 Sheets-Sheet 1

Raymond M. Hessert
INVENTOR

Dec. 20, 1949 R. M. HESSERT 2,492,127
DOCUMENT PHOTOGRAPHING MACHINE
Filed Jan. 14, 1943 18 Sheets-Sheet 2

Dec. 20, 1949 — R. M. HESSERT — 2,492,127
DOCUMENT PHOTOGRAPHING MACHINE
Filed Jan. 14, 1943 — 18 Sheets-Sheet 6

Raymond M. Hessert
INVENTOR
BY
ATTORNEY

Dec. 20, 1949     R. M. HESSERT     2,492,127
DOCUMENT PHOTOGRAPHING MACHINE
Filed Jan. 14, 1943     18 Sheets-Sheet 7
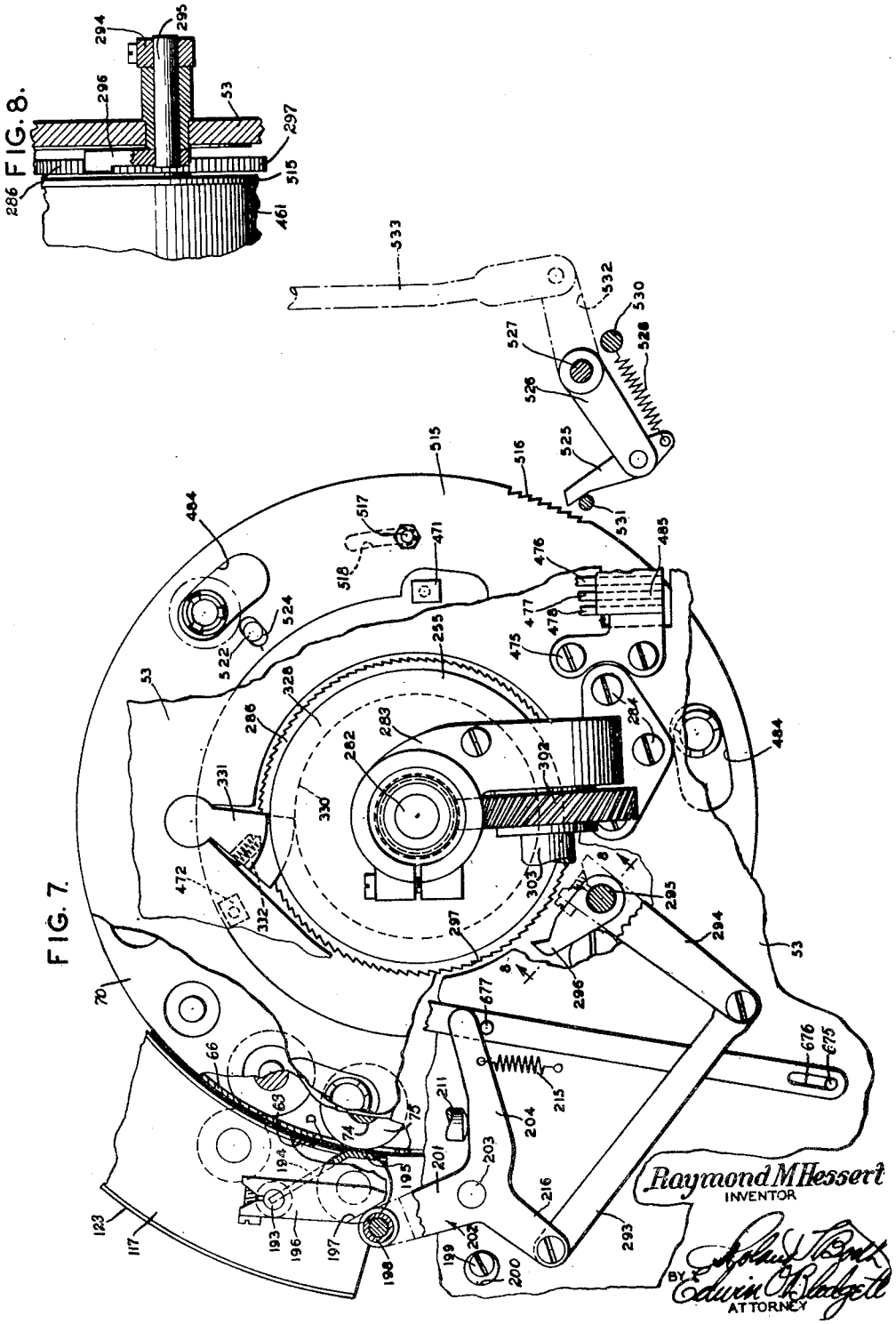

Dec. 20, 1949  R. M. HESSERT  2,492,127
DOCUMENT PHOTOGRAPHING MACHINE
Filed Jan. 14, 1943  18 Sheets-Sheet 8

INVENTOR
Raymond M. Hessert
BY
Edwin C. Blodgett
ATTORNEY

Dec. 20, 1949 R. M. HESSERT 2,492,127
DOCUMENT PHOTOGRAPHING MACHINE
Filed Jan. 14, 1943 18 Sheets-Sheet 9
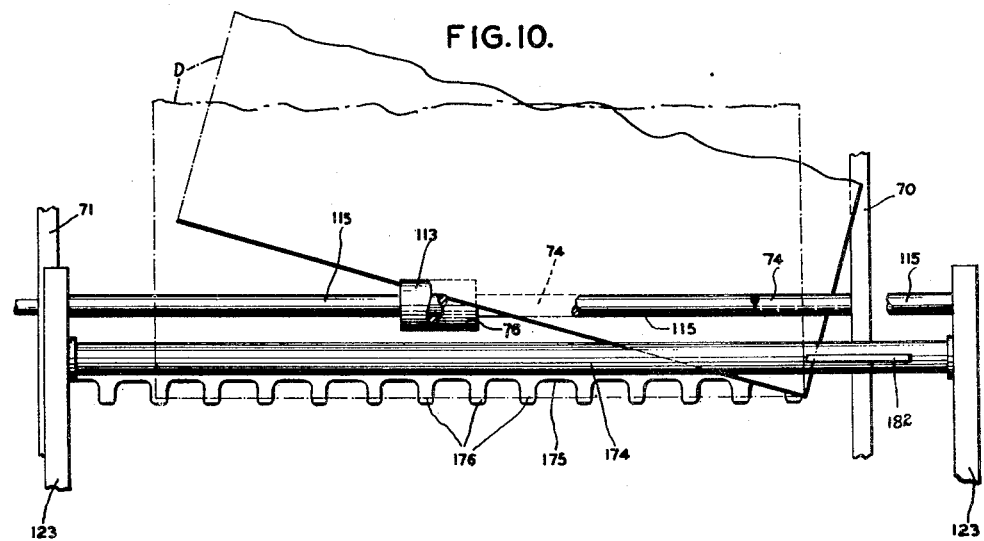
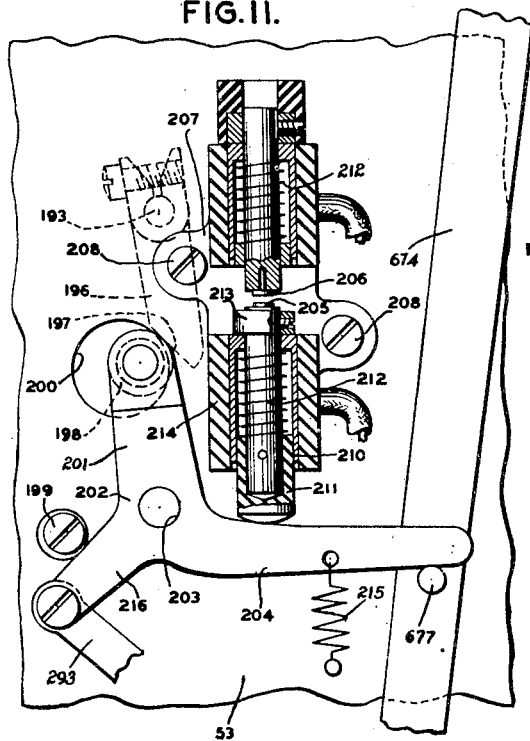
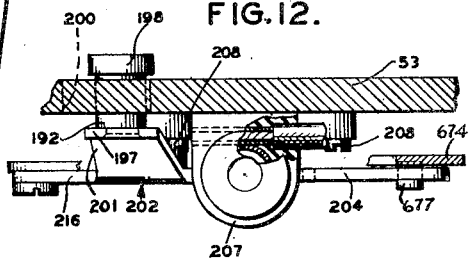
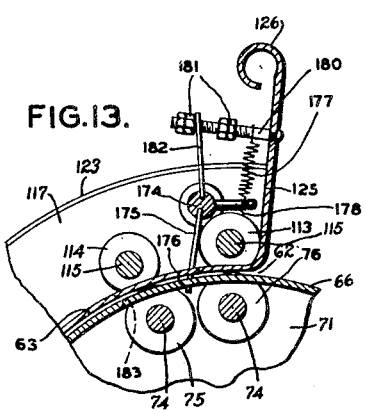
INVENTOR
Raymond M. Hessert
BY
ATTORNEY Dec. 20, 1949     R. M. HESSERT     2,492,127
DOCUMENT PHOTOGRAPHING MACHINE
Filed Jan. 14, 1943     18 Sheets-Sheet 10

INVENTOR
Raymond M. Hessert
BY Edwin B. Blodgett
ATTORNEY

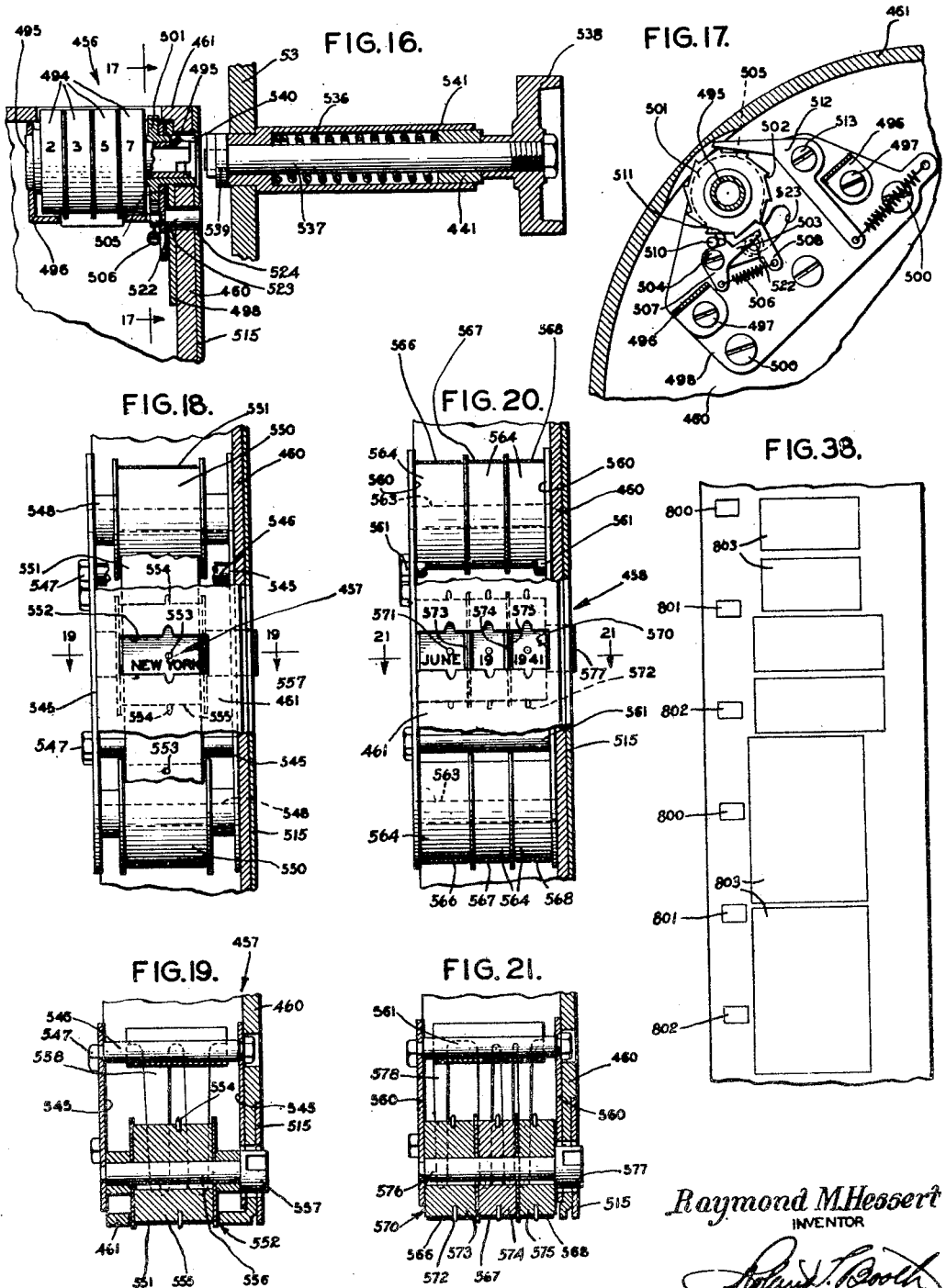

Dec. 20, 1949     R. M. HESSERT     2,492,127
DOCUMENT PHOTOGRAPHING MACHINE
Filed Jan. 14, 1943     18 Sheets-Sheet 13

Raymond M. Hessert
INVENTOR

BY Edwin O. Blodgett
ATTORNEY

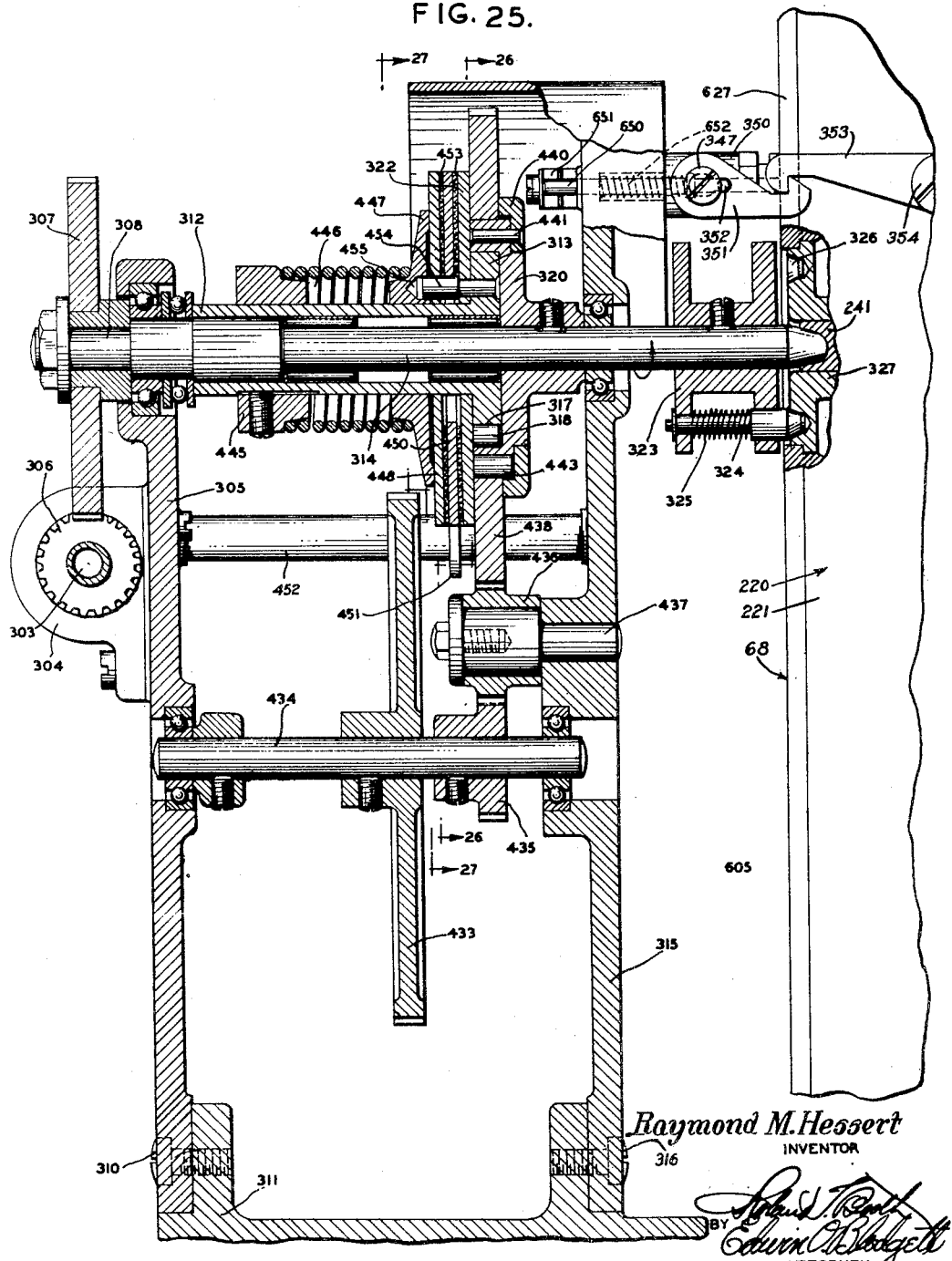

Dec. 20, 1949  R. M. HESSERT  2,492,127
DOCUMENT PHOTOGRAPHING MACHINE
Filed Jan. 14, 1943  18 Sheets-Sheet 15
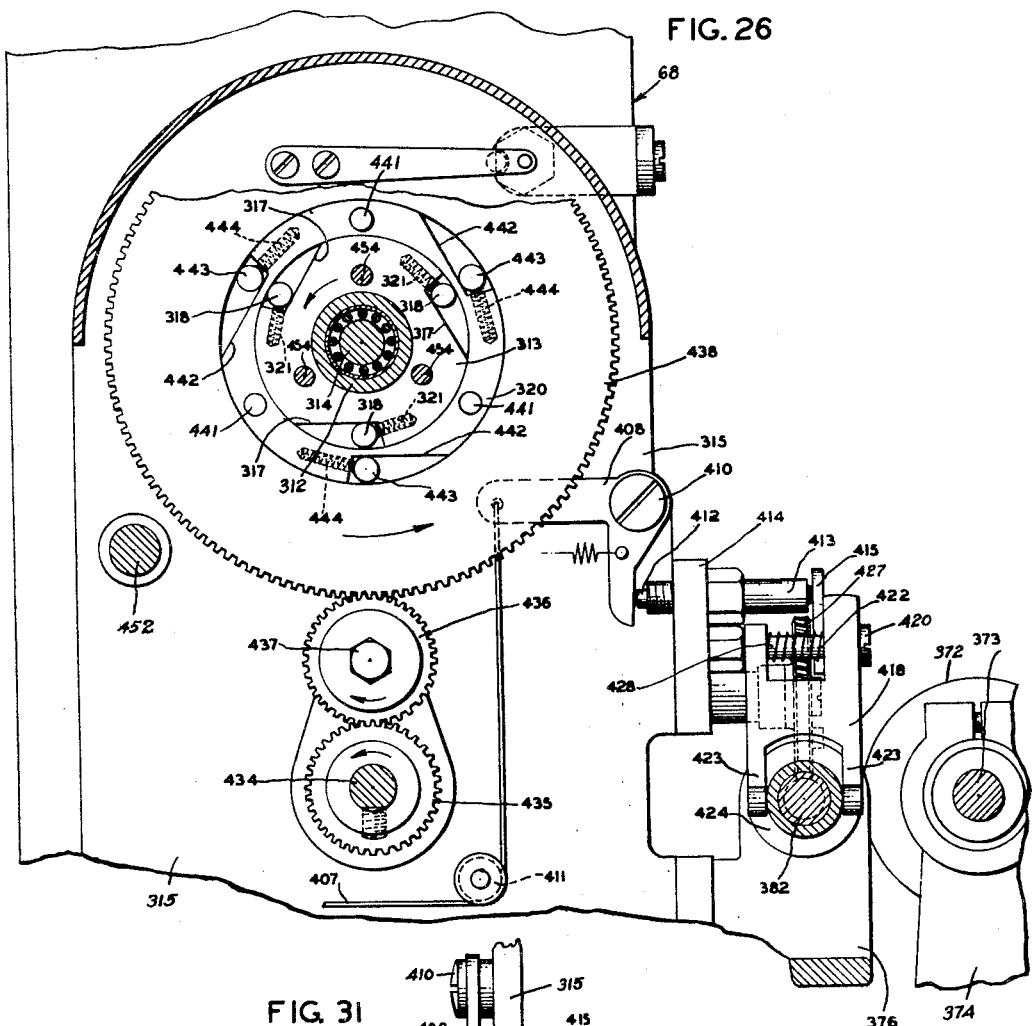
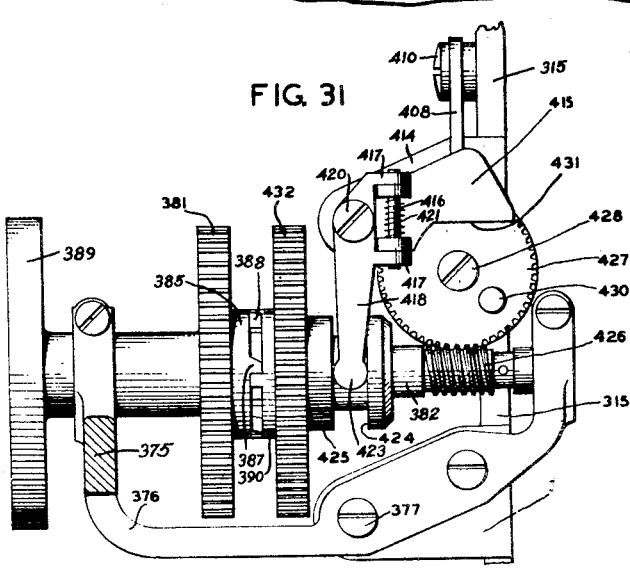
Raymond M. Hessert
INVENTOR

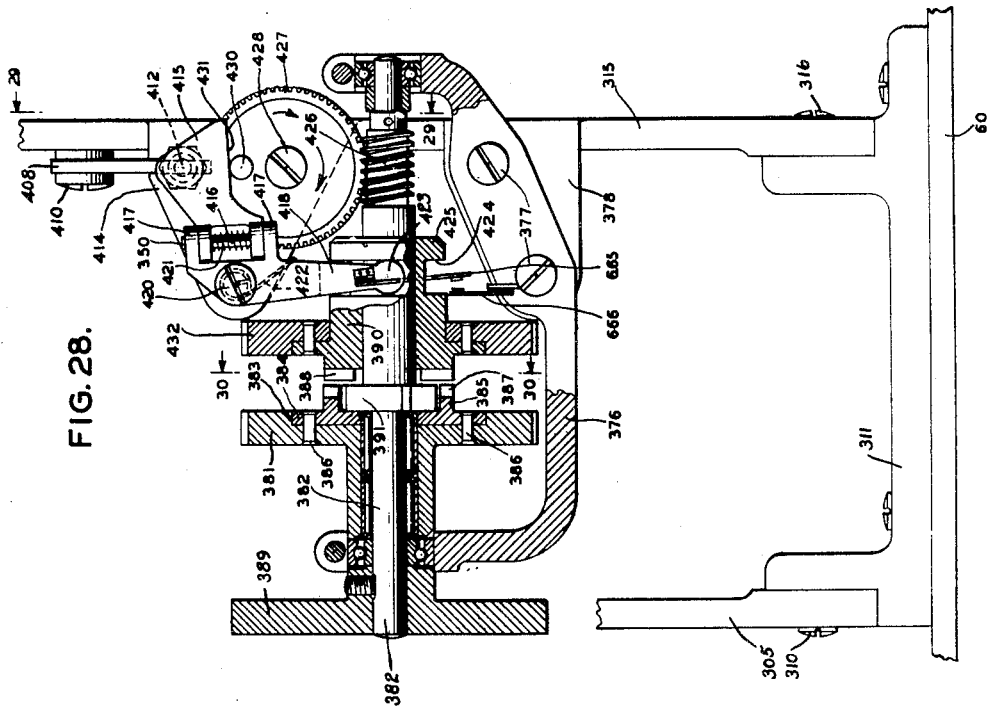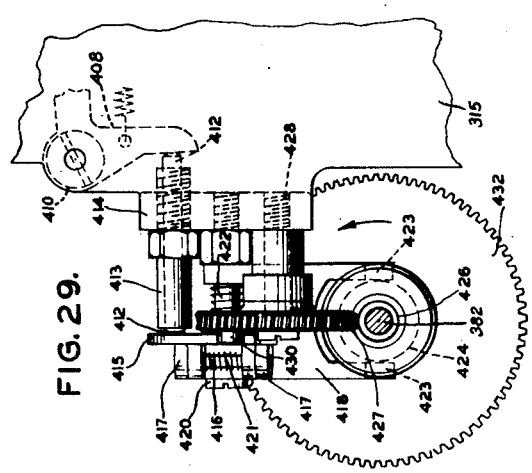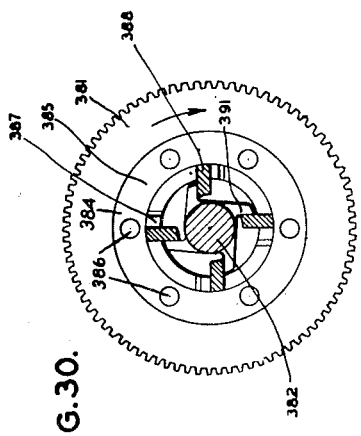

Dec. 20, 1949   R. M. HESSERT   2,492,127
DOCUMENT PHOTOGRAPHING MACHINE
Filed Jan. 14, 1943   18 Sheets-Sheet 17
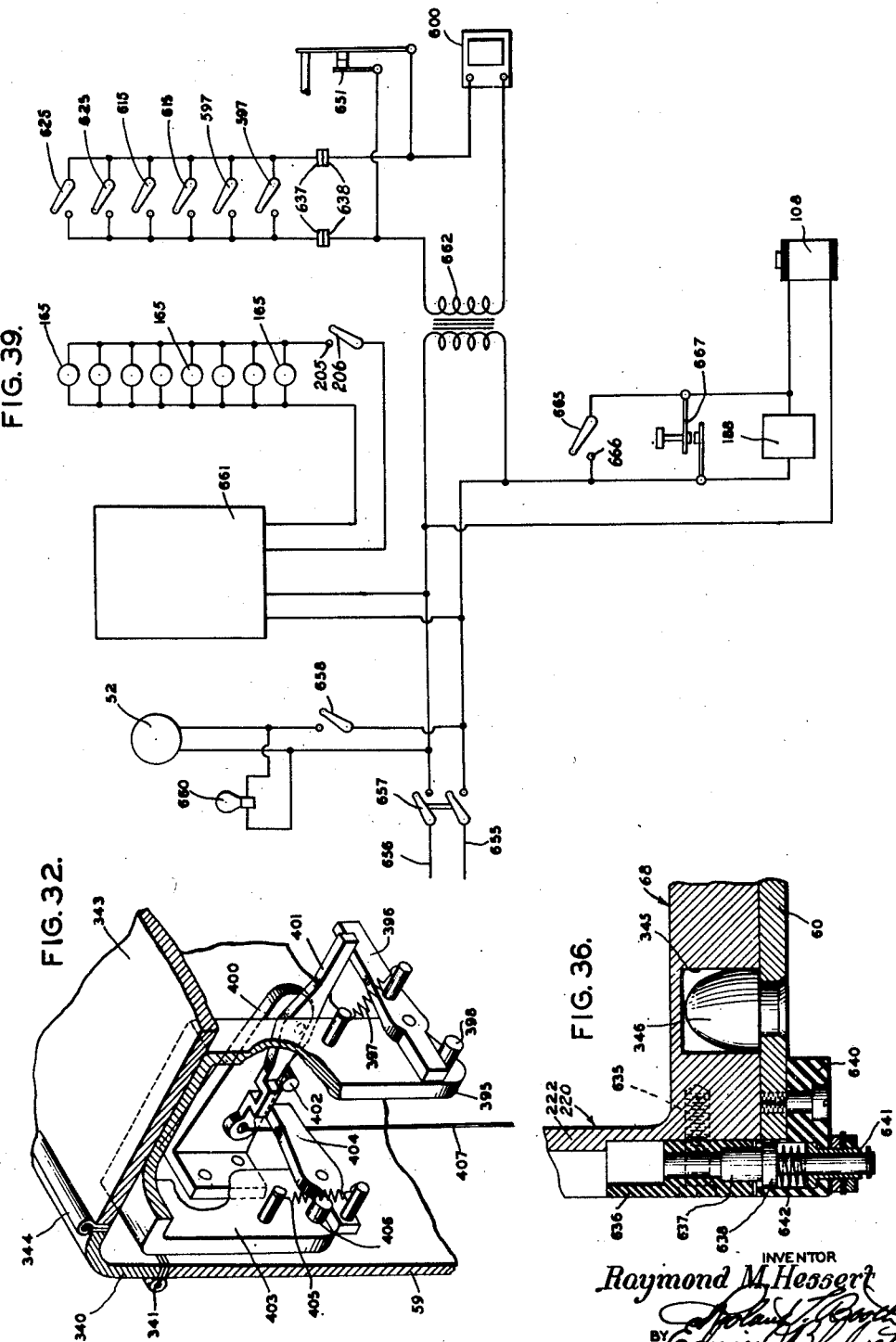
INVENTOR
Raymond M. Hessert
BY
Edwin B. Blodgett
ATTORNEY Dec. 20, 1949  R. M. HESSERT  2,492,127
DOCUMENT PHOTOGRAPHING MACHINE
Filed Jan. 14, 1943  18 Sheets-Sheet 18

INVENTOR
Raymond M. Hessert
BY
Edwin C. Blodgett
ATTORNEY

Patented Dec. 20, 1949

2,492,127

UNITED STATES PATENT OFFICE 2,492,127

DOCUMENT PHOTOGRAPHING MACHINE

Raymond M. Hessert, Audubon, N. J.

Application January 14, 1943, Serial No. 472,359

25 Claims. (Cl. 88—24)

This invention relates to a document photographing machine particularly adapted for rapidly photographing bank checks, statements, index cards, letter and similar sheets.

The invention comprehends the provision of a document photographic machine that will photograph documents of varying size, with particular reference to the length of the document from the top to the bottom thereof which may vary in length to any extent and be photographed in a manner that will provide a single continuous image of the document on a film strip.

The invention provides for the production of photographs of documents on a film strip without wasting the film wherein each succeeding document may vary in size and will have the photographic image thereof on the film arranged so that images of adjacent documents on the film will have their ends terminating in adjacent slightly spaced relation.

The invention comprehends the provision of a document photographing machine having a feed mechanism for automatically receiving and feeding documents of various sizes successively through the photographic plane and then discharging the documents in successive order from the machine, while suitable document controlled mechanism feeds only sufficient film to obtain an image of the document and then discontinues the film feed. A source of illumination is controlled by the document for providing sufficient light to illuminate the document as it passes through the photographic plane for photographing on the film.

The invention provides an indicia displaying mechanism for simultaneously displaying identification, numbering and dating indicia to the photographic plane of the camera simultaneously with a document passing through the same photographic plane for identifying and indexing the photo record. Suitable means is provided for changing the setting of the indicia by convenient manually operated means at any time during the use of the machine.

The invention further provides a means for stopping the feed of a document in said machine at the beginning of the feeding operation if more than one document is fed into the machine at the same time.

The invention provides means for automatically feeding the lead strip at each end of the photographic film controlled by the operation of the cover when the camera is to be removed or replaced in the machine. It will also feed a predetermined length of film over the exposed portion when the cover is opened for removal of the camera before all of the film is used.

The invention provides a convenient structural assembly for the document feeding mechanism with the illuminating structure associated therewith in a manner that each may be conveniently swung out of normal operative position into an inoperative position to provide ready access to the entire mechanism for inspection, repair and replacement; a signal system for indicating when the film strip breaks, or the film is completely used as well as the absence of the camera in the machine; and the provision of a light indicator for registering to the machine operator when one or more of the lamp bulbs of the illuminating system are burned out or extinguished.

The invention comprehends the provision of a document feed structure having a plurality of rollers arranged in a manner to provide a partially cylindrical feed path to the document for flexing the document into curved form during feeding through the machine past the photographic plane for obtaining a more uniform feeding of documents past the photographic plane wherein the feed rollers are arranged to cooperate for bending the document into curved form as it is fed through the machine in order to obtain efficient feeding of documents of varying size through the machine for photographing, with the reduction of friction and noise in the operation of the machine.

In the drawings:

Fig. 7 is an enlarged fragmentary side elevation looking from the left hand side of the machine showing the document controlled device for starting the film feed drive mechanism in non-feeding position.

Fig. 8 is a fragmentary cross section taken substantially along the line 8—8 of Fig. 7 disclosing in detail the ratchet and pawl arrangement for controlling indexing and film feed operations.

Fig. 10 is an enlarged fragmentary top plan view of the document straightening device.

Fig. 11 is an enlarged detail side view, partly in cross section, showing the light switch and its associated mechanism.

Fig. 12 is a top plan view partly in cross section of the switch shown in Fig. 11.

Fig. 13 is an enlarged detail cross section showing the document straightening device taken substantially along the line 13—13 of Fig. 5 and looking from the left-hand side of the machine.

Fig. 14 is an enlarged cross section showing the indexing mechanism taken substantially along the line 14—14 of Fig. 6 disclosing the date, location, and counter units.

Fig. 15 is an enlarged cross section taken substantially along the line 15—15 of Fig. 6 disclosing the clutch construction for the indexing mechanism and the counter advancing disc.

Fig. 16 is a cross section of the counter in its uppermost position and the manually operable setting means looking forward from a rear portion of the machine.

Fig. 17 is an enlarged cross section showing the details of the counter operating mechanism taken substantially along the line 17—17 of Fig. 16.

Fig. 18 is a detail view of the location unit partly broken away with portions shown in cross section.

Fig. 19 is a horizontal cross section taken substantially along the line 19—19 of Fig. 18.

Fig. 20 is a detail view of the date unit with portions broken away and shown in cross section.

Fig. 21 is a horizontal cross section taken substantially along the line 21—21 of Fig. 20.

Fig. 25 is an enlarged cross section taken substantially along the line 25—25 of Fig. 3, disclosing the drive mechanism for feeding the film.

Fig. 26 is a cross section taken substantially along the line 26—26 of Fig. 25, disclosing the clutch arrangement for operating the film drive mechanism.

Fig. 28 is an enlarged cross section taken substantially along the line 28—28 of Fig. 3 showing the clutch and drive mechanism for feeding a predetermined footage of film before and after using the camera.

Fig. 29 is a cross section taken substantially along the line 29—29 of Fig. 28.

Fig. 30 is a cross section taken substantially along the line 30—30 of Fig. 28.

Fig. 31 is a view similar to Fig. 28 showing the clutch engaged shortly after the film drive has started to operate.

Fig. 32 shows an enlarged fragmentary perspective of the control mechanism for feeding a predetermined footage of film or lead strip at opposite ends of the film.

Fig. 36 is an enlarged cross section showing the contact mechanism for electrically connecting the circuits in the camera to the electric circuits in the rest of the machine.

Fig. 38 is a diagrammatic view showing a portion of a film strip with developed images of a document, date, location, and number.

Fig. 39 is a circuit diagram for the machine.

Frames

Figure 1:
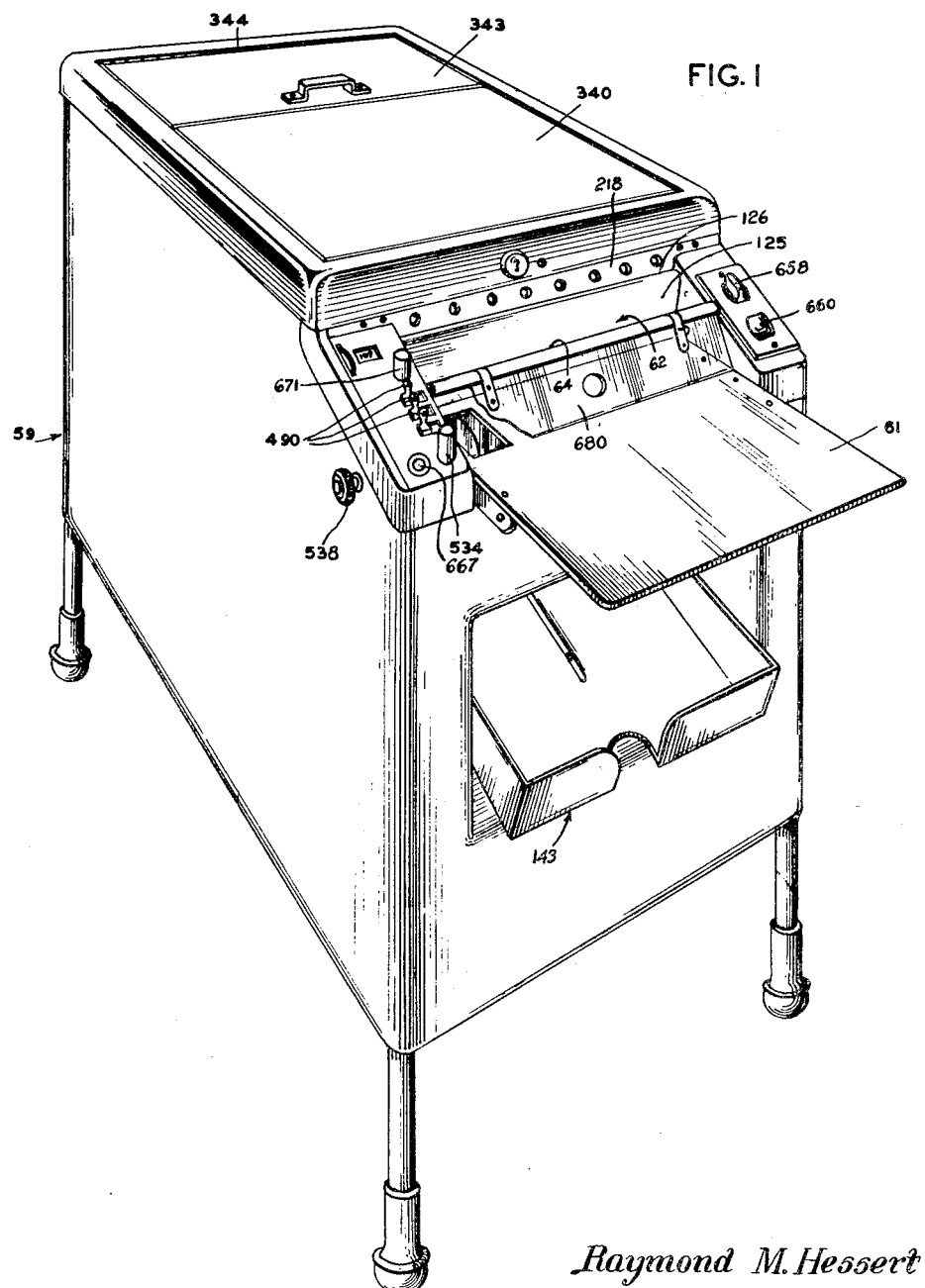
Fig. 1 is a perspective showing the front end of the machine disclosing the location of the controls indicators and the feed and discharge openings.

Referring to Figs. 1, 2, 3, and 4, the present machine is mounted generally upon a movable truck or base 50 having secured at its upper structure thereof a pair of longitudinally extending side bars 51 and 52. Located at the front of the machine and secured to the inner sides of side bars 51 and 52 by screws 55 is a pair of upright frame walls 53 and 54 which are prevented from lateral displacement by tie rods 56. The frame walls 53 and 54 are adapted to support the document feeding mechanism, the lighting device, the indexing mechanism and its controls, and the control keyboard of the machine. Located midway between the ends of side bars 51 and 52 and secured thereto is a cross plate 57 upon which is mounted a suitable motor 58 for driving the various units of the present machine. Located at the rear of the machine and secured to side bars 51 and 52 is another cross plate 60, upon which rests the camera unit and the drive mechanism for feeding the film. The machine is enclosed within and rendered light-proof and sound-proof by a suitable casing 59 which is secured to side bars 51 and 52.

Document drive and feed mechanisms

Figure 9:
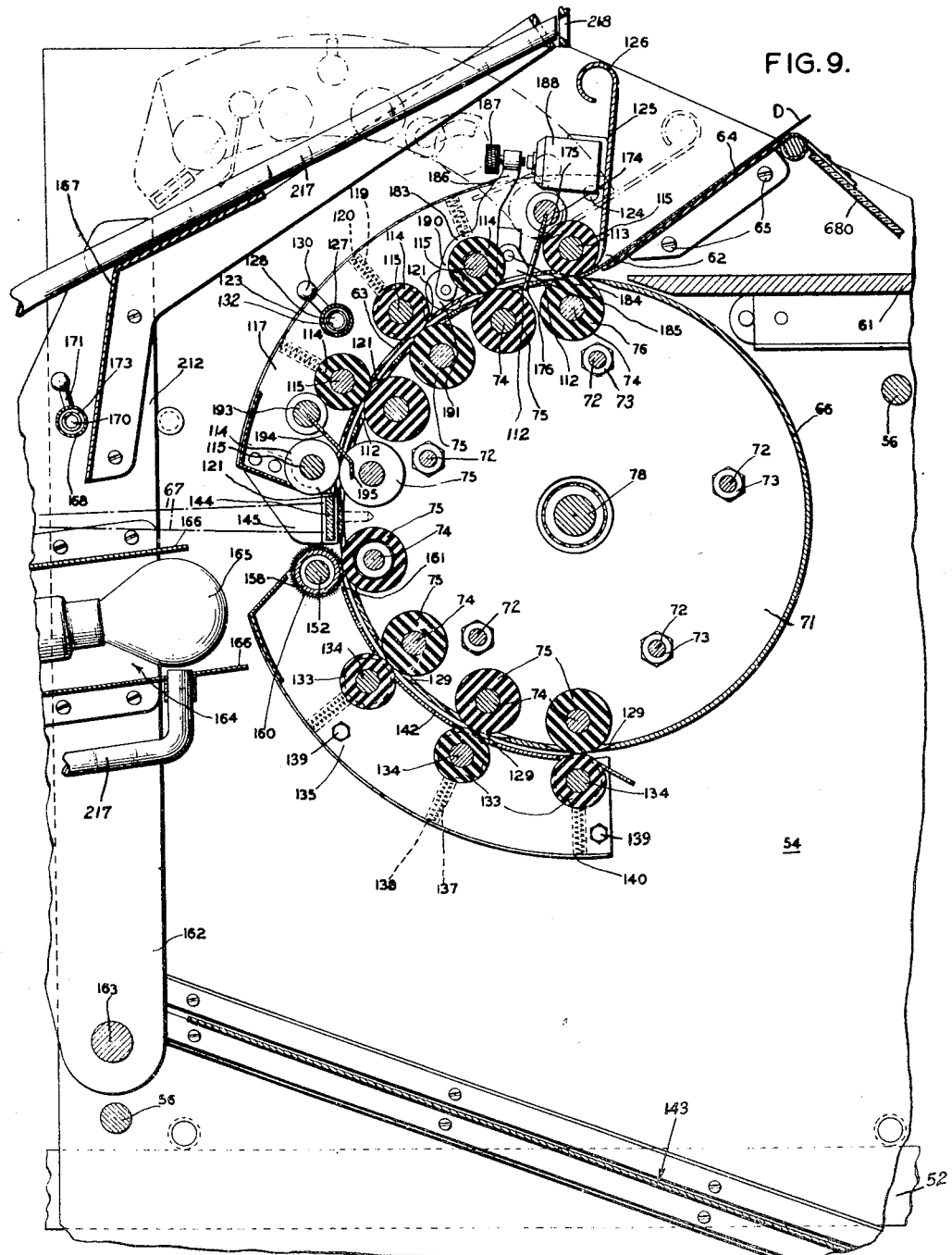
Fig. 9 is a cross section taken substantially along the line 9—9 of Fig. 4 looking from the left-hand side of the machine and disclosing the document feed roll assembly.
Figure 23:
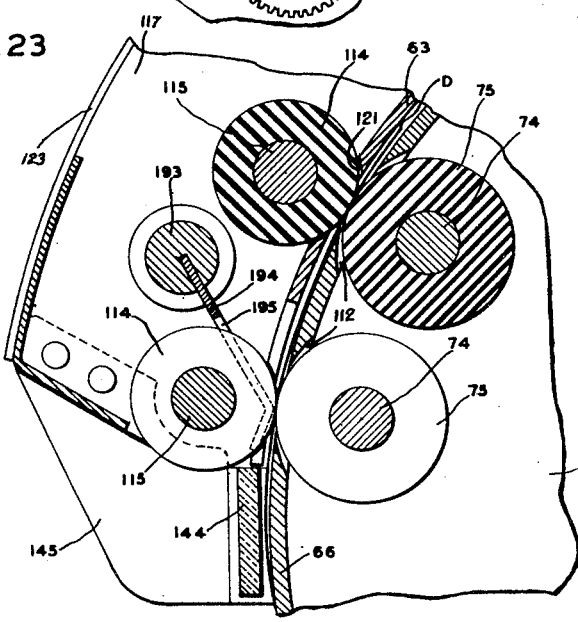
Fig. 23 is an enlarged fragmentary transverse cross section showing the pressure feed rolls and the drive feed rolls in relation to the stationary cylinder of the document feed mechanism.

Before the documents designated by the character D in Figs. 7, 9 and 23 are fed into the present machine, they are first arranged in groups and stacked upon a table 61. Table 61 is slidably and removably mounted upon frame walls 53 and 54 on suitable brackets carried by said walls. The documents are then fed one at a time through a throat 62 (Fig. 9) formed by the front portion of an arcuate guide plate 63 forming parts of an upper guide unit and the rear edge of an auxiliary table 64. The table 64 extends transversely between and is secured to the frame plates 53 and 54 by screws 65. The documents are then fed around a stationary cylinder 66 by means to be described, past a focal range shown in dot and dash lines in Figs. 4 and 9, and indicated by the reference numeral 67, of a photographic apparatus broadly designated as 68. The photographic apparatus 68 may be a duplex camera of the motion picture type which will be described in detail later.

Figure 2:
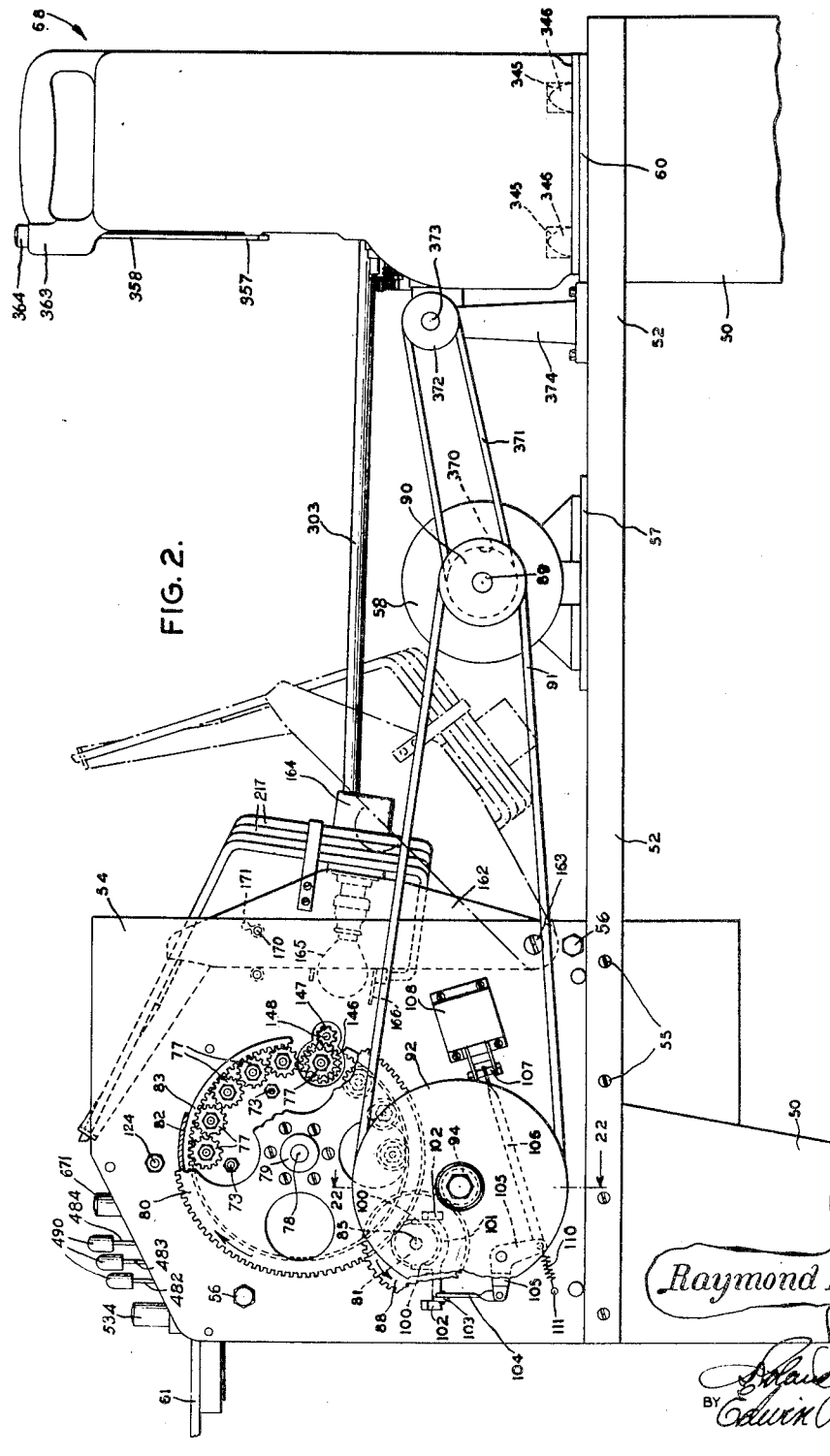
Fig. 2 is a side elevation looking at the right-hand side of the machine with the outside casing removed, portions being broken away and shown in section to illustrate some of the structural details.
Figure 6:
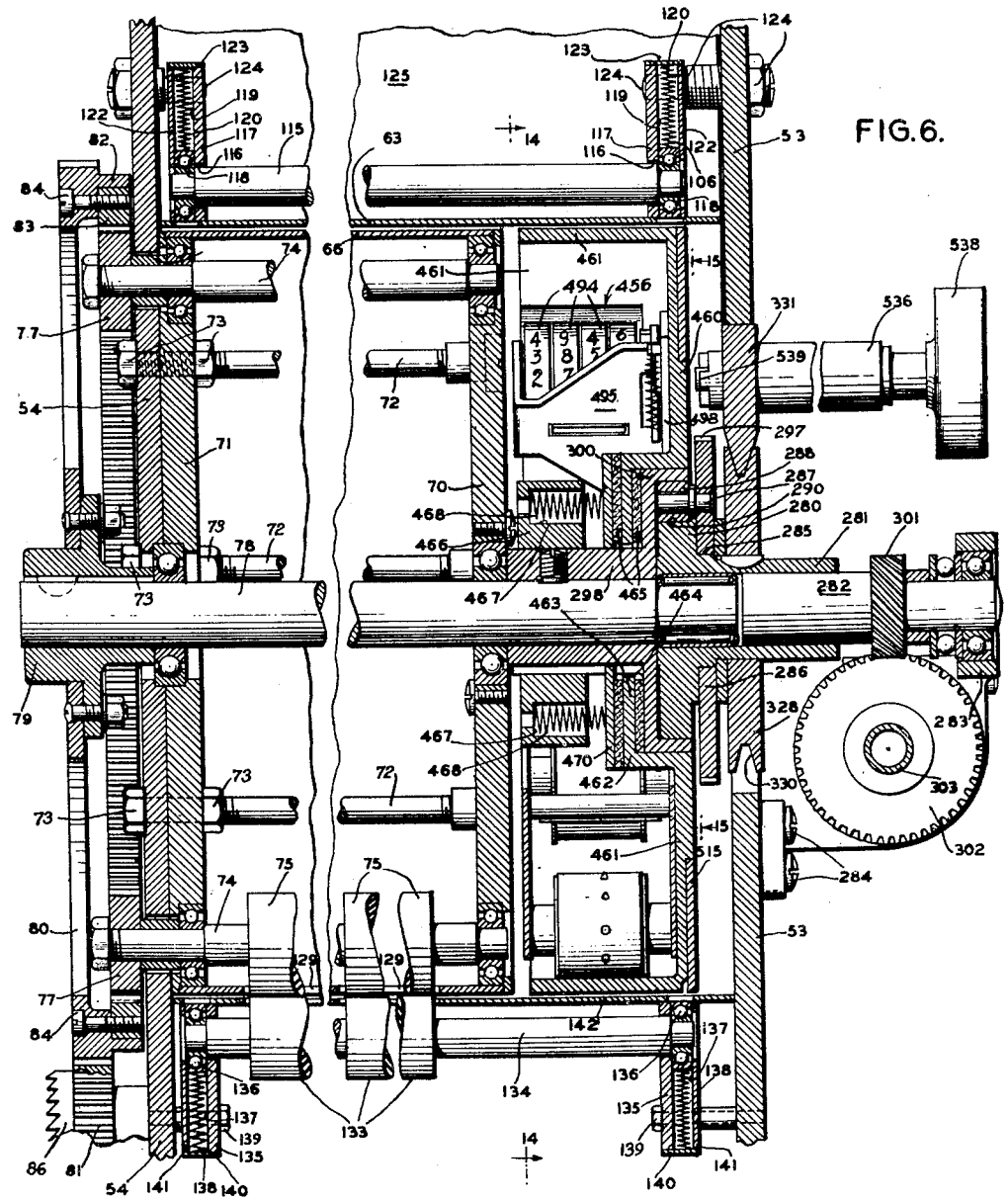
Fig. 6 is an enlarged fragmentary cross section taken substantially along line 6—6 of Fig. 3 looking from the rear and disclosing the drive mechanism for the document feeding and indexing devices.

Referring to Figs 2, 6, and 9, cylinder 66 extends between end frame walls 53 and 54 and is provided with a left and right-hand end wall 70 and 71, respectively, the inner face of each of which is formed with an annular shoulder to receive one end of cylinder 66. Cylinder 66 and end walls 70 and 71 form a unitary structure held rigidly together by means of a plurality of tie rods 72, one end of which terminates in the end wall 70 and the other end of which passes through walls 71 and 54 and are secured thereto by means of nuts 73. Extending longitudinally within and arranged in an arcuate line concentric with the cylinder 66 is a plurality of shafts 74, nine in number. Each of the shafts 74 except the topmost (see Fig. 9) has secured thereto a plurality of feed rolls 75. The topmost shaft 74 has secured thereto a single feed roll 76 (Fig. 10) of limited width for reasons which will hereinafter appear. Each of the shafts 74 is journaled at its left-hand end (right Fig. 6) in the end wall 70 and journaled near its right-hand end in the wall 71. The right-hand end of each shaft extends beyond the wall 71, through an opening in the wall 54, and has secured thereto a gear 77. The means for rotating the feed roll shafts 74 will now be described.

Figure 22:
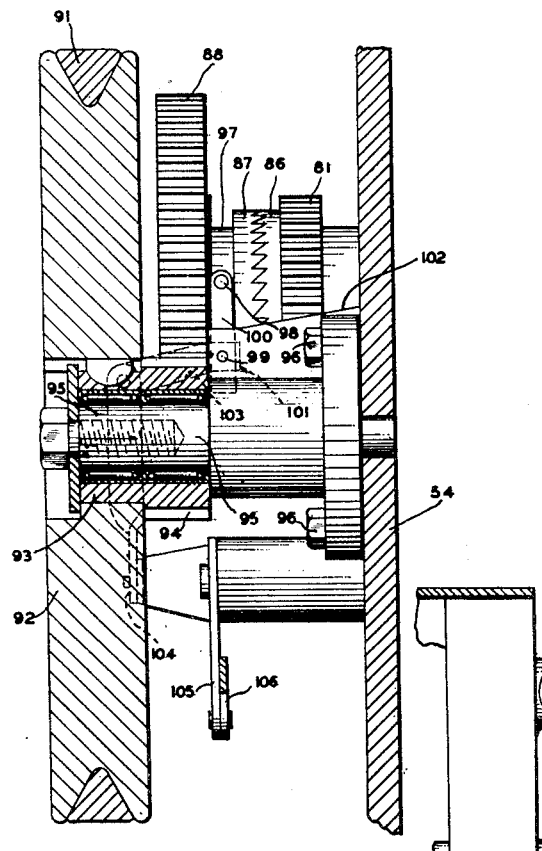
Fig. 22 is an enlarged cross section taken substantially along the line 22—22 of Fig. 2, disclosing the clutch mechanism for operating the document feed rolls.

Located within cylinder 66 in axial relation therein is a main drive shaft 78 which extends longitudinally of said cylinder and is journaled toward its left-hand end (Fig. 6) in the walls 54 and 71 and toward its right-hand end in the wall 70. The left-hand end of the shaft 78, Fig. 6, extends beyond frame wall 54 and has secured thereto a flanged hub 79 to which is secured a gear 80 constantly in mesh with another gear 81. The gear 80 is formed with an annular flange 82 within which seats an internal gear 83 secured to gear 80 by screws 84. The gear 83 meshes with all of the gears 77 fixed to feed roll shafts 74. As is best shown in Figs. 2 and 22, gear 81 is rotatably mounted upon a stub shaft 85 extending outwardly from and fixed to frame wall 54 and has formed integral therewith a clutch disc 86. This disc 86 has teeth which are normally in engagement with the teeth of a continuously rotating clutch disc 87 also rotatably mounted upon the stub shaft 85. Disc 87 is formed integral with a gear 88 driven by means now to be described. The motor 58 is adapted to drive a shaft 89 which has secured thereto a pulley 90 connected by belt 91 to another pulley 92 (Figs. 2, 4 and 22) keyed to hub 93, of gear 94 rotatably mounted upon stub shaft 95 secured to frame wall 54 by bolts 96.

From the foregoing it will be seen that clockwise rotation of shaft 89 will rotate pulley 92 and gear 94 in a clockwise direction (Fig. 2) which in turn will rotate gear 80 in a clockwise direction through gear 88, clutch discs 87 and 86 and gear 81. Rotation of gear 80 will, through the internal gear 83 and gears 77 rotate all of the feed rolls 75 in a clockwise direction (counter-clockwise as shown in Fig. 9).

In order to disengage clutch discs 86 and 87 to stop the rotation of feed rolls 75, clutch disc 87 is formed with a channelled portion 97 (Fig. 22) adapted to receive a pair of pins or studs 98 individually secured to a pair of upright arms 100 integral with a bell-crank 101 (Fig. 2) mounted for rocking movement upon a pair of brackets 102 secured to frame wall 54. Another arm 103 on bell-crank 101 has the upper end of a link 104 pivotally connected thereto, the lower end of said link being connected to one arm of a bell-crank 105 pivotally mounted upon frame wall 54. The other arm of bell-crank 105 is pivoted to a forwardly extending link 106, which link has the rear end connected to armature 107 of a normally deenergized solenoid 108. The link and armature 106 and 107, respectively, are urged to the front of the machine by means of spring 110 connected at one end to pin 111 fixed to frame wall 54 and the other end connected to bell-crank 105. This spring 110 also urges clutch members 86 and 87 into operative engagement.

The construction is such that when solenoid 108 is energized, by means to be described later, armature 107 and link 106 will be drawn to the right (Fig. 2) against the tension of spring 110 to rock bell-crank 105 in a counter-clockwise direction. This will cause downward movement of bell-crank 105 to rock bell-crank 101 which through arms 100 and pins 98 moves clutch disc 87 axially along shaft 85 out of engagement with clutch disc 86. Upon the deenergization of solenoid 108, spring 110 will cause clutch disc 87 to move back to its normal engaging position.

Referring to Figs. 6 and 9 it will be recalled that there are provided nine shafts 74 within cylinder 66, the topmost shaft having a single feed roll 76 mounted thereon and each of the remaining eight shafts mounting a plurality of feed rolls 75. Beginning with the topmost shaft 74 and counting in a counter-clockwise direction in Fig. 9, feed rolls 75 and 76 secured to the first five shafts 74 have the peripheries extending slightly beyond the outer periphery of cylinder 66 through rectangular slots or openings 112 (see also Figs. 5 and 23) formed in the cylinder. The topmost feed roll 76 cooperates with an associated pressure roll 113 (Figs. 9 and 10) and the remaining four groups of feed rolls 75 cooperate with associated pressure rolls 114. The pressure rolls 113 and 114 form part of the upper guide unit and are secured to shafts 115 the ends of which extend through openings 116 formed in a pair of arcuate frame plates 117 and are journaled in bearings 118.

Bearings 118 (Fig. 6) are guided for radial movement in grooves 119 formed in plates 117 of the upper guide unit and are urged by springs 120 disposed in grooves 119 in a direction whereby pressure rolls 113 and 114 are brought into engagement with the feed rolls 76 and 75, respectively. Bearings 118 are retained in their respective grooves 119 by the previously described arcuate guide plate 63 secured at its ends to the underside of plates 117. The diameter of the inner periphery of guide plate 63 is slightly greater than the diameter of the outer periphery of cylinder 66 to permit passage of a document D between the cylinder and guide plate.

Slots 121 are provided in guide plate 63 through which the peripheries of pressure rolls 113 and 114 slightly protrude to engage feed rolls 75 and 76 respectively. A retainer plate 122 is secured to and is in spaced parallel relation to the outer face of each frame plate 117 for preventing lateral displacement of bearings 118 and springs 120. Secured to the outer periphery of each of frame plates 117 is a retainer strip 123 against the inner face of which bears one end of each spring 120.

In order to facilitate adjustment and repair of the pressure and feed rolls and also to facilitate the removal of documents which may have been jammed between said rolls during feeding thereof, the pressure rolls 113 and 114 and their mounting as above described, form a structural unit referred to as the upper guide unit, pivoted upon a pair of studs 124 individually secured to the frame walls 53 and 54.

The arcuate guide plate 63 is provided with an upright wall 125 the top portion of which is bent to form a finger piece 126 by which the unitary structure may be rocked from a normal operating position shown in full lines to an open inoperative position shown in dot and dash lines in Fig. 9.

Figure 5:
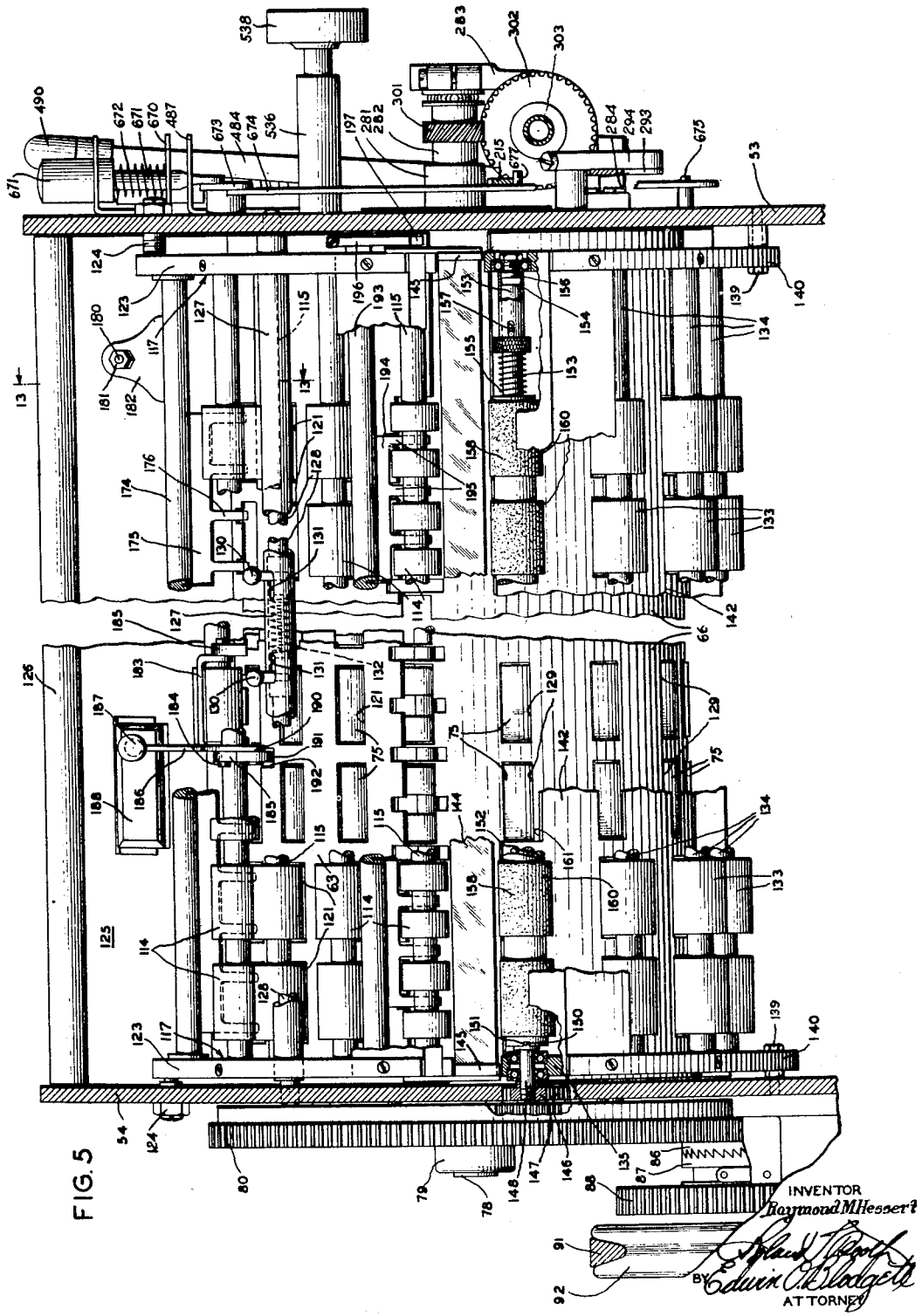
Fig. 5 is an enlarged fragmentary cross section taken substantially along the line 5—5 of Fig. 3 and disclosing the document feeding mechanism.

A tube 127 is located between and has its ends secured to the two frame members 117, as best shown in Figs. 5 and 9. A pair of plungers 128 is disposed in tube 127 and have the outer ends extending beyond the ends of said tube for engaging in openings formed in upright walls 53 and 54 when the pressure rolls are in effective position (full lines in Fig. 9). The inner ends of said plungers are provided with finger pieces 130 which extend through longitudinal slots 131 in tube 127. A compression spring 132 disposed between the inner ends of the plungers serves to urge the plungers axially apart.

When it is desired to move the upper guide unit from the operative position shown in full lines to the dot and dash line position, in Fig. 9, the finger pieces 130 are first brought together against the tension of spring 132, moving the outer ends of plungers 128 out of the openings in the frame walls. The unit is then rocked in a clockwise direction (Fig. 9) about its pivot 124 until the outer ends of the plungers are above the upper edge of frame walls 53 and 54. It will be seen that, if the plungers are then released, they will be moved further apart through the action of spring 132 so that the outer ends thereof will rest upon the upper edge of the frame walls and hold the unit in the open inoperative position.

It has been previously described that there are nine driven feed roll shafts 74, the first five of which, beginning from the topmost shaft (Fig. 9) and counting in a counter-clockwise direction, have secured thereon feed rolls 75 and 76 which cooperate with respective pressure rolls 114 and 113. The feed rolls 75 carried by three of the remaining four feed roll shafts 74, counting from the bottom feed roll in a clockwise direction in Fig. 9, have their peripheries extending slightly beyond the periphery of the cylinder 66 through slots 129 and cooperating with pressure rolls 133 of a lower guide unit which are substantially similar in structure and arrangement to pressure rolls 114. The pressure rolls 133 are secured to shafts 134 having the ends extending through openings formed in a pair of arcuate frame plates 135 of the lower guide unit, and journaled in bearings 136. Bearings 136 are slidable radially in grooves 137 between the outer faces of plates 135 and spaced parallel retainer plates 141. Springs 138 are also disposed in grooves 137, in a direction whereby pressure rolls 133 are brought into engagement with feed rolls 75. Each of said plates 135 has secured to the outer periphery thereof a retainer strip 140, against which bears one end of each spring 138. The retainer plates 141 are secured to the outer faces of plates 135 for preventing lateral displacement of springs 138 and bearings 136. A transversely extending arcuate guide plate 142 is located against and secured to the inner periphery of plates 135 in slightly spaced relation away from the outer periphery of cylinder 66, serves to guide a document fed between the above-mentioned feed and pressure rolls and forms part of the lower guide unit. As will be seen in Fig. 9, the forward marginal portion of arcuate guide plate 142 is bent downward in order to facilitate the ejection of documents into tray 143. Guide plate 142 has a plurality of slots through which the peripheries of rolls 133 project to engage feed rolls 75. Bolts or studs 139 extend through arcuate frame plates 135 and upright frame walls 53 and 54 for mounting the lower guide unit in operative position with rolls 133 engaging rolls 75 and with springs 138 under a desired amount of tension for feeding documents. By removal of bolts 139 at the left-hand upper portion as shown in Fig. 9 the bottom guide unit may be swung downwardly on the remaining two bolts 139 for inspection and repair purposes or to remove a jammed document. If desired a latch construction similar to that used on the upper guide unit may be used in place of the upper pair of bolts 139.

Located behind the stationary cylinder 66 and running longitudinally thereof, is a transparent plate 144 (Figs. 5, 9 and 23), preferably glass, through which the document may be exposed to the focal range 67 as it is fed through the machine. The transparent strip 144 is secured at its ends to a pair of brackets 145. Brackets 145 are secured to end plates 117. The above described transparent member 144 is provided so as to guide the document through the focal range. Slightly below transparent member 144 is located the fourth driven feed roll shaft 74, counting from the lowest shaft in a clockwise direction (Fig. 9). In order to insure that a document when passing the focal range, is taut so that a properly focused image is presented to the camera, gear 77 secured to the above-mentioned fourth shaft 74, is formed integral with another gear 146 of larger diameter as is best seen in Figs. 2 and 5. The gear 146 meshes with a smaller gear 147 secured to one end of a short stub shaft 148 journaled in the arcuate frame plate 135 of the lower guide unit located at the right of the machine (left Fig. 5).

The other end of stub shaft 148 is provided with a key portion 150 engaging in slot 151 formed at the right-hand end (left Fig. 5) of a removable shaft 152 extending transversely of the machine and longitudinally to the adjacent shaft 74 (Fig. 9). The other end of shaft 152 has a reduced portion 153, which loosely fits within sleeve 154. A compression spring 155 is provided to urge the sleeve axially toward the right (Fig. 5) into cooperation with stud 156 having a rotatable mounting on left-hand arcuate frame plate 135. A pin and slot arrangement 157 is provided to limit the axial movement of sleeve 154.

A plurality of feed rolls 158 are mounted on shaft 152 and have the periphery of each covered with a resilient fabric, such as velvet 160 forming a brush which extends through openings 161 in the arcuate guide plate to cooperate with the periphery of the fourth feed rolls 75 counting from the bottom in Fig. 9. It will be noted at this time that gear 146 is larger than gear 77 and about twice as large as gear 147 with which it is in mesh. Accordingly, brush 160 travels at a much greater speed than feed rolls 75. Normally with shaft 152 in operative position as shown in Figs. 5 and 9, the nap of velvet fabric or brush 160 resiliently bears against the periphery of feed rolls 75. When the document is fed between feed rolls 75 and the velvet brush 160, the nap traveling at a much greater speed than feed rolls 75 will tend to straighten whatever bulge or fold that may be present in the document. Also, due to the resiliency of the nap, once the document is taut, the fabric will slip. When it becomes necessary to replace fabric covering 160, due to wear or adjustment, sleeve 154 (Fig. 5) is moved to the left against the tension of spring 155, until said sleeve is free from stud 156. The entire feed roll assembly may then be removed for such replacement or adjustment.

*Light source*

Figure 3:
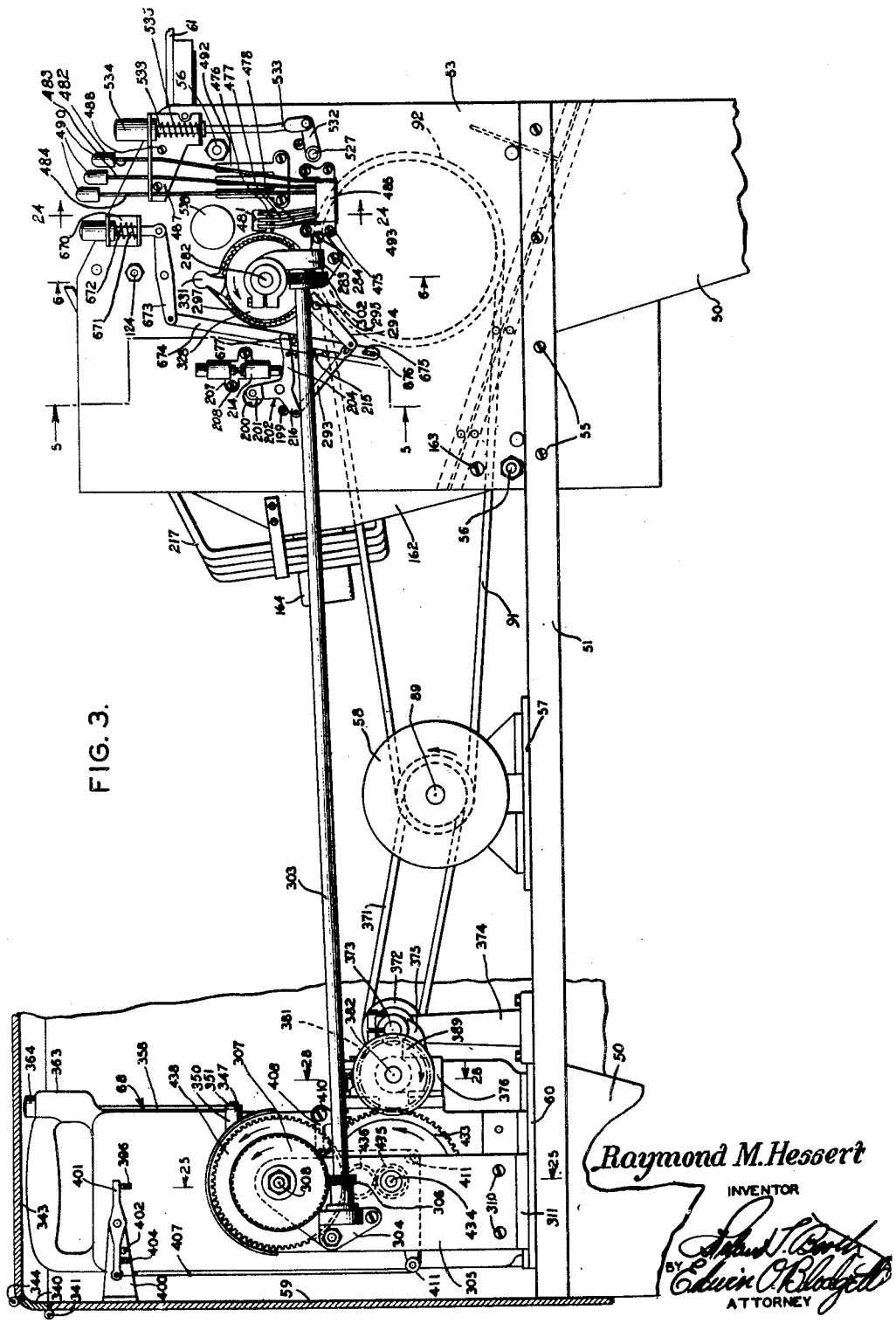
Fig. 3 is a side elevation looking at the left-hand side of the machine with the casing partly removed and partly shown in cross section.
Figure 4:
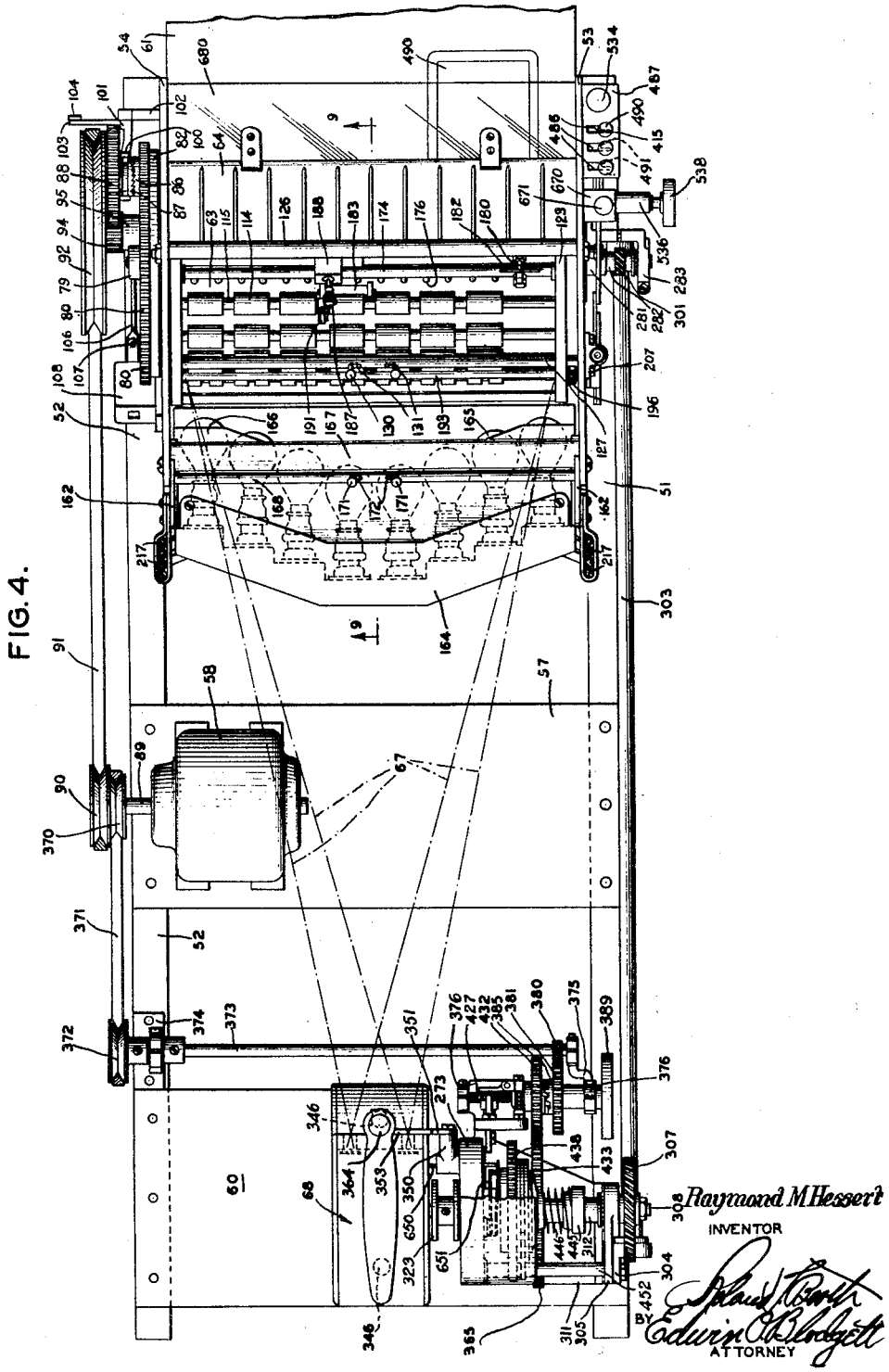
Fig. 4 is a top plan view of the machine with the casing removed.

The source of light for illuminating the document while passing through the focal range 67 consists of a pair of upright end frames or plates 162 located just inside frame walls 53 and 54 (Figs. 2, 3, 4 and 9). Plates 162 are pivotally mounted upon a cross shaft 163 (Fig. 9) fixed at its ends to frame walls 53 and 54. Referring to Figs. 2, 3, 4 and 9, a frame structure 164 is located and secured midway between the upper and lower ends of frame plates 162. Frame structure 164 is provided with a plurality of sockets, eight in number, which are adapted to receive suitable lights 165. As is best seen in Fig. 4, the sockets and lights are arranged in stepped formation in a manner to provide an equal distribution of light rays for illuminating a document while passing through focal range 67. Frame structure 164 is further provided with flanged portions 166 to localize the light rays. Frame plates 162 have an upright cross plate 167 secured to the upper portions thereof in order to prevent any light reflections from entering photographic apparatus 68. The light structure is, therefore, in the form of a unit movable from the effective position shown in full lines to the ineffective and open position shown in dot and dash lines in Fig. 2 in order to provide access for inspection, assembly, repair and adjustment of the document feeding and control mechanisms.

Referring to Figs. 4 and 9, a tube 168 is located between and secured to the upper portions of plates 162. Tube 168 is similar in structure to tube 127 hereinbefore described. A pair of plungers 170 are slidably mounted in tube 168 and have the outer ends adapted to protrude from the ends of tube 168 for engagement in openings formed in end frame walls 53 and 54. Plungers 170 have finger pieces 171 extending through elongated slots 172 in tube 168 and normally projected away from each other by a compression spring 173. When it is desired to move the entire light structure from the full line position to that shown in dot and dash lines (Fig. 2), the finger pieces 171 are moved together against the tension of spring 173 to disengage the outer ends of plungers 170 from the openings in frame walls 53 and 54. This permits free pivotal movement of the light structure.

*Document straightening device*

In order to insure that the documents are fed in a square position past the focal range 67 so the image thereof is presented to a minimum portion of film, a document straightening device is provided in the present machine. Referring to Figs. 4, 5, 9, 10, and 13, it will be recalled that the topmost feed roll shaft 74 has secured midway between the ends thereof a single feed roll 76, rather than a plurality of feed rolls as on the other shafts 74. Cooperating with the single feed roll 76 is a single pressure roll 113. Slightly to the rear and above the feed rolls 76 and 113 (Fig. 9) lies a cross shaft 174 journaled at its ends in arcuate frame plates 117 of the upper guide unit. Cross shaft 174 is notched in the lower periphery thereof to receive and hold a cross bail 175 having a plurality of depending fingers 176 extending from the lower free edge. A spring 177 (Fig. 13) has one end connected to pin 178 fixed to shaft 174 and the other end connected to pin 180 fixed to front wall 125 of arcuate guide plate 63, and urges shaft 174 and bail 175 in a counter-clockwise direction. Clockwise and counter-clockwise movement of shaft 174 is limited by adjustable stops 181 cooperating with upright arm 182 fixed to shaft 174 (Fig. 13). Fingers 176 extend through suitable slots formed in arcuate guide plate 63 and stationary cylinder 66. It will be seen that in normal position as shown in Figs. 9 and 13, fingers 176 are in the path of travel of document D. The above construction is such that, if a document is fed in other than a square position, as shown in full lines in Fig. 10, the leading edge or corner of said document will come to rest against any of the plurality of fingers 176 as the corner of the document will not be driven forward with sufficient force to displace fingers 176 against the tension of spring 177. Further rearward movement of the document will bring the center portion thereof in contact with feed rolls 76 and 113, which will cause the document to be pivoted about the advance corner thereof, until the entire leading edge of said document contacts the maximum number of fingers 176 and presses against said fingers with an increased pressure sufficient to overcome the tension of spring 177 and rock the bail and fingers out of its path.

*Micro-switch*

In the present machine, means are provided whereby the document feeding mechanism is prevented from operating when two or more documents overlapping each other are inadvertently fed past the throat 62 and when documents exceeding a predetermined thickness are fed past said throat.

Referring to Figs. 2, 6, and 22, it will be recalled that the feed roll shafts 74 are continuously driven by a train of gears through normally engaged clutch members 86 and 87, which clutch members may be disengaged by energizing solenoid 108. As is best seen in Figs. 4, 5, and 9, one of the means for energizing solenoid 108 includes a U-shaped bell-crank 183 pivotally mounted upon trunnions 184, carried by a pair of upright brackets 185 mounted on arcuate guide plate 63. Bell-crank 183 is provided with upwardly extending arm 186 carrying at its upper end an adjustment screw 187, the shank of which is adapted, when the bell-crank is rocked, to close a contact within a micro-switch generally designated as 188, adjusted so movements of .002 to .003 of an inch are sufficient to make or break a circuit. Another arm 190 (Figs. 5 and 9) formed integral with bell-crank 183 extends downwardly and has rotatably mounted at the lower end thereof a roller 191, a portion of which extends through and beyond slot 192 in arcuate guide plate 63 and rests upon the outer periphery of stationary cylinder 66. Bell-crank 183 is urged by gravity in a counter-clockwise direction and is rocked clockwise as viewed in Fig. 9 by a document passing between roller 191 and cylinder 66. The adjustment screw 187 may be adjusted in such a manner that, when a document of a predetermined thickness passes through the machine, the contacts in microswitch 188 remain open, and, therefore, solenoid 108 remains deenergized permitting the machine to continue operating. However, when two or more documents are fed at one time, bell-crank 183 will be rocked a greater distance clockwise causing adjustment screw 187 to close the contacts within micro-switch 188 to energize the solenoid, and thus disengage clutch members 86 and 87 to stop the feed rolls from operating. It is necessary to remove the documents before the machine can again be started. The location of bell-crank 183 is such that when two documents operate it and stop the machine, the trailing edges of the documents are still located in throat 62 for manual engagement and removal.

Light switch

In the present machine means are provided whereby the previously described lamps 165 are illuminated before the leading edge of a document reaches the focal range 67 and remain illuminated until after the rtailing edge of the document is fed beyond the focal range. Referring to Figs. 5, 7, 9, 11, 12, and 23, a cross shaft 193 is journaled at its end in arcuate frame plates 117 and is formed with a radial slot extending longitudinally thereof to receive and hold a cross bail 194. Cross bail 194 is formed at its lower free edge portion with a plurality of fingers 195, which extend downwardly through openings in arcuate guide plate 63 and stationary cylinder 66 and lie in the path of travel of a document D. The left-hand end of shaft 193 (right, in Fig. 5) extends beyond frame plate 117, and has a depending arm 196 secured to the free end thereof (Figs. 7, 11 and 12). Arm 196 has a cam surface 197 on the free end for cooperation with a roller 198.

The roller 198 extends toward the left passing through an opening 200 in frame wall 53 and is mounted for rotation upon an upright arm 201 of a bell-crank 202. The bell-crank 202 is rotatably mounted upon stud 203 secured to left-hand frame wall 53, and is provided with forwardly extending arm 204. When bell-crank 202 is rocked by arm 196, arm 204 closes a pair of contacts 205 and 206, thereby closing the circuit to illuminate lamps 165.

Referring to Figs. 11 and 12, contacts 205 and 206 are mounted upon a common bracket 207 of suitable insulating material such as Bakelite, which is secured to the left-hand face of wall 53 by screws 208. Contacts 205 extends downwardly through an opening in an inverted cup-shaped member 210 (Fig. 11), and a button 211 of insulating material is secured to its lower end for sliding movement within the inner periphery of said cup-shaped member 210. A spring 212 serves to urge contact 205 away from contact 206 and is limited in such movement by a collar 213 secured to the upper end of contact 205. The inverted cup-shaped member 210 is held stationary within a cylindrical housing 214 formed integral with bracket 207. The contact 206 is mounted for sliding movement in much the same manner as contact 205 and, therefore, the description concerning contact 205 is sufficient for contact 206.

The above construction is such that when the leading edge of a document engages fingers 195 (as shown in Fig. 7), arm 196 is rocked clockwise, thus rocking bell-crank 202 in a counterclockwise direction to the position shown in Fig. 7. In the initial rocking of bell-crank 202 in a counterclockwise direction, arm 204 thereof will move contact 205 upwardly into engagement with contact 206. Further rotation of bell-crank 202 will cause both contacts to move upwardly against the tension of their respective springs 212, and will remain in this position during the time that the fingers 195 feel the presence of a document as shown in Figs. 7 and 23.

When the rear edge of the document has moved out of the path of fingers 195, spring 215 (Figs. 3 and 11) having one end connected to a pin on frame wall 53, and the other end connected to arm 204 of bell-crank 202 will cause cross bail 194 and fingers 195 thereof to return to normal position, as shown in Fig. 9. The circuit through contacts 205 and 206 is not broken during the return movement of bail 194 until just before it reaches its normal position. This provides a delayed action in opening the light circuit so the rear edge of the document has passed the focal range 67 before the lights are extinguished. This delayed action is obtained by springs 212 keeping the sliding contacts 205 and 206 engaged for sliding movement through a portion of the return movement of cross bail 194 and bell-crank 202 and until the collar on contact 206 engages the upper end of bracket 207. In order that a fine adjustment may be obtained between contacts 205 and 206, upright frame wall 53 has secured thereon an adjustable eccentric 199 which cooperates with a third arm 216 formed integral with bell-crank 202 for limiting movement of said bell-crank.

Friction eliminating device for document feeding

It is an established principle that, when an element is fed between a pair of rolls, the element will tend to travel in a line perpendicular to the line joining the centers of the rolls. In view of this principle it will be seen that, if the center of arcuate guide plate 63 lies on the line joining the centers of the rolls 114 and 75, the document, tending to travel in a line perpendicular to the line of centers, will be deflected by the plate 63. However, in doing so practically the entire document will at some time or other rub against the inner periphery of the plate 63 causing undue friction. Also, it will be seen that the leading edge of the document may during its travel along an arcuate path strike against an obstruction which in this case may be the transparent member 144 preventing proper feeding of the document and causing possible damage to the document and machine. In order to eliminate a maximum amount of friction and also to prevent jamming due to improper feeding of the document the feed roll structure is arranged in the following manner:

Feed rolls 114 as shown in Figs. 9 and 23 are offset in a counter-clockwise direction, and in the direction of document feed relative to feed rolls 75, that is the centers of rolls 114 do not lie in the radial planes intersecting the center of cylinder 66 and the centers of rolls 75. The offset is such that the leading edge of the document being fed perpendicular to the line joining the centers of the feed rolls 75 and 114 will not contact the inner periphery of the arcuate guide plate 63 until it has traveled a considerable distance beyond the two feed rolls and slightly before it is gripped by the following set of feed rolls. While only four sets of feed rolls 75 and 114 are shown as offset in the drawings (Fig. 9), it will be understood that the remainder of the sets of feed rolls may be similarly offset if de-

Telltale for the lights

Referring to the circuit diagram disclosed in Fig. 39, the lights 165 are connected in parallel. In this manner should one light fail to go on for any reason, the rest of the lights remain illuminated. When one or more lights go out the desired photographic results cannot be obtained. Therefore, all of the lights 165 must be effective to obtain the desired photographic results. It is, therefore, necessary that means be provided whereby the operator is signaled whenever one or more of the lights 165 has gone out. In the present machine, and as may best be seen in Figs. 1, 2, 3, 4 and 9, means are provided for obtaining the above result and for signaling to the operator upon the condition of the lights. This means provides an illumination conducting rod 217, such as Lucite (methylmethacrylate) for each lamp 165. The lower end of each rod 217 extends through an opening in one of the flanged portions 166 and is positioned so as to catch the light rays of its respective lamp 165. The rods are provided with a plurality of bends to extend around and to the rear of frame structure 164 and flanged portions 166, then upwardly at the sides of the machine near plates 162 beyond focal range 67, and then toward the front of the machine where the upper ends terminate in uniform spaced relation for observation through openings in panel 218 (Figs. 1 and 9). The rods are suitably fastened to cross plate 167. The upper ends of the rods are arranged in the same order in panel 218 as the lower ends and lamps 165. Panel 218 (Fig. 1) forms part of the front wall of casing 59.

Camera

It will be recalled that the photographic apparatus 68 used in the present instance is a duplex camera using duplicate films simultaneously fed past their respective lenses at a uniform speed during photographing of documents.

Figure 33:
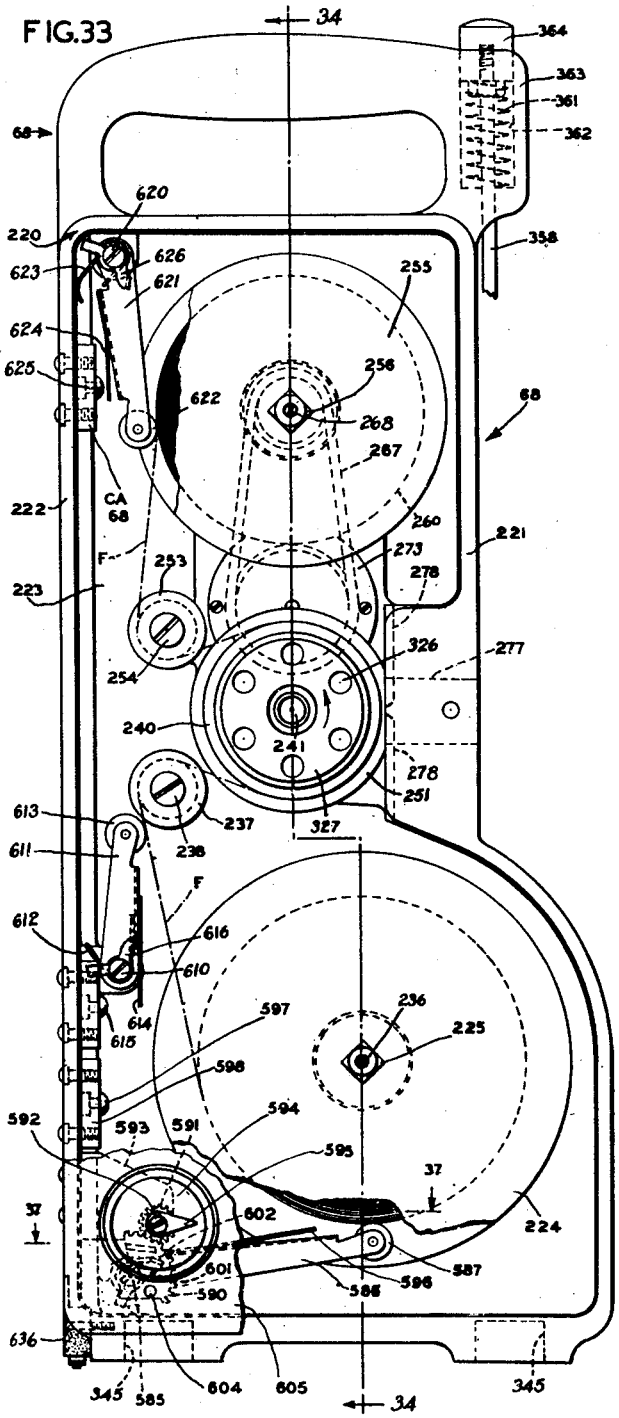
Fig. 33 shows the camera in side elevation looking from the left-hand side with the cover broken away.
Figure 34:
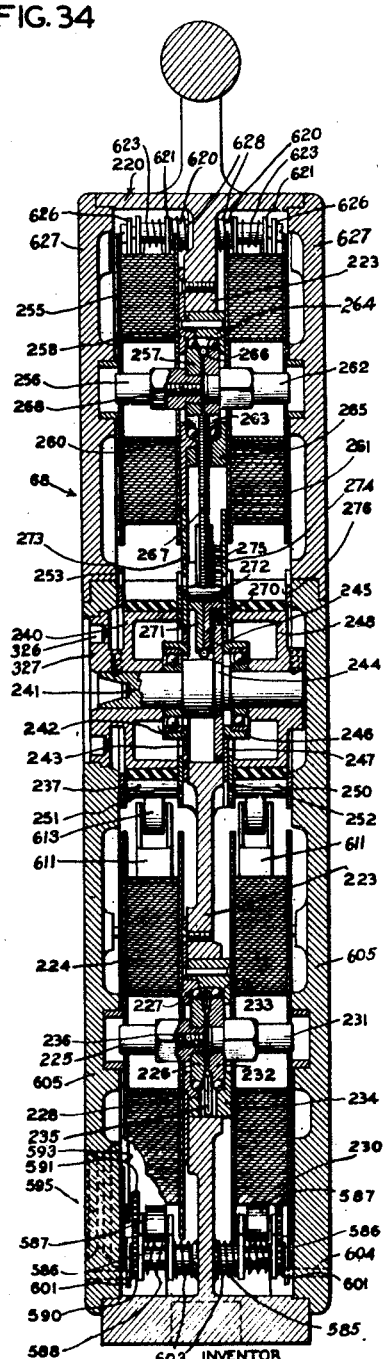
Fig. 34 is a vertical cross section through the camera taken on line 34—34 of Fig. 33.

Referring particularly to Figs. 33 and 34, camera 68 consists of a housing 220 having front and rear walls 221 and 222, respectively, and a central partition wall 223. Located at the lower portion of the camera and to the left of partition 223 (Fig. 34), is a film supply spool 224, mounted upon and rotatable with a stub shaft 225 suitably mounted on bearing 226. Bearing 226 is mounted for rotation within a circular channel portion 227 formed in disc 228 suitably secured to rib 223. Located to the right of rib 223 is a second film supply spool 230 mounted upon and rotatable with a shaft 231 in axial alignment with shaft 225. Shaft 231 is secured to bearing 232. Bearing 232 is rotatably mounted within a channelled portion 233 formed in disc 234. Disc 234 is secured to disc 228.

A spring ring 235 of U-shape construction, located within the inner faces of bearings 226 and 232, is provided to cause a drag for said bearings. Shaft 225 is threaded to receive a bolt 236 for adjusting the space relation between bearings 226 and 232. The film F extends upwardly from supply spool 224, around idler roller 237 mounted upon shaft 238 and thence around a friction wheel 240 fixed to shaft 241. The shaft 241 is journaled to the right of said friction wheel 240 in a bearing 242 secured to plate 243. Plate 243 is, in turn, secured to the left-hand side of partition 223. The shaft 241 extends to the right (Fig. 34) through an opening in partition 223 and is provided with shoulder 244 to which is secured gear 245. The shaft is journaled to the right of said gear in bearing 246 carried by plate 247 which, in turn, is secured to the right-hand side of partition 223. Secured to the right-hand end of shaft 241 is another friction wheel 248 for feeding the film F from the second supply spool 230. Shaft 238 extends through partition 223 and has rotatably mounted on its right-hand portion idler roller 250 whereby the film from the second supply spool 230 is guided to friction wheel 248. Secured to plate 243 and located between said plate and the inner side of friction wheel 240 is a spacer plate 251. Secured to plate 247 and located between said plate and the other friction wheel 248 is a spacer plate 252. The plates 251 and 252 serve to prevent lateral displacement of the film F.

The film F extends from friction wheel 240 around idler roller 253 mounted upon shaft 254 fixed to partition 223. The film then extends upwardly and is anchored to a receiving spool 255, mounted upon and rotatable with shaft 256 secured to rotatable disc 257. Rotatable disc 257 is mounted for rotation on ball bearings in a race 258 formed on supporting plate 260 secured to the left-hand side of partition 223 (Fig. 34). A second receiving spool 261 for receiving the film fed from the second supply spool 230 is mounted upon and rotatable with shaft 262 located to the right of and in axial alignment with shaft 256. Shaft 262 is secured to rotatable disc 263. The rotatable disc 263 is rotatably mounted on ball bearings within a recessed ball race portion 264 formed in a cup-shaped disc 265. Disc 265 is secured to plate 260. The rotatable discs 257 and 263 are provided at the inner ends with annular grooves 266 adapted to receive one end of a spring belt 267. The shaft 256 is provided with a threaded portion to receive a bolt 268 for adjusting the bearings of rotatable discs 257 and 263. Spring belt 267 extends downwardly through a slot in disc 265 and is received in an annular groove formed by a pair of beveled discs 270 and 271 adjacent to one another and mounted for rotation upon a short shaft 272 journaled at its ends in a pair of plates 273 and 274 mounted on opposite sides of partition 223. Fixed to beveled discs 270 and 271 and concentric therewith is a gear 275 which meshes with the previously mentioned gear 245. Shaft 254 extends through partition 223 and has mounted at the right-hand end thereof another roll 276 for guiding the film of the second supply spool from friction wheel 248 to the second receiving spool 261.

From the above description, it will be seen that when friction wheel 240, located to the left of partition 223 is driven by means to be described, gear 245 rotatable therewith will, through gears 275, drive spring belt 267 to rotate shafts 256 and 262 causing the winding of the film around the core of the respective receiving spools 255 and 261 and past the focal point of the camera.

It will be noted at this time that each of the friction wheels 240 and 248 fixed to shaft 241 is located along the center line of the focal range 67 of the camera and slightly beyond or to the left (Fig. 33) of its respective lens unit 277. The camera 68 is so positioned in the machine that a photographic image of the document will appear on the film at a reduction from original size which may vary in proportion, for example from 17 to 1 to approximately 28 to 1. A pair of plates 278 secured to the inner face of the front wall 221 of the camera is arranged in aligned relation with adjacent ends slightly spaced apart to provide the camera aperture. Plates 278 are located between each friction wheel and lens and provided to limit the size of image presented to the film by the size of the aperture.

Film drive

The present machine is equipped to photograph a document during movement of said document through the focal range 67. As the document is fed downwardly in the machine, about stationary cylinder 66, by the feed and pressure rolls 75, 76, 113 and 114, respectively (Fig. 9), it will be seen that in order to photograph the document properly, it is necessary that the film F is fed past the focal range 67 in a direction opposite to that of the document or upwardly, as the camera is shown in Figs. 2, 3 and 33. The means for feeding the film will now be described.

The previously described main drive shaft 78 extends to the right (Fig. 6) beyond end wall 70 of cylinder 66 and has rotatably mounted thereon a clutch member 280 having an elongated hub 281 formed integral therewith. The hub 281 extends beyond the extremity of shaft 78, beyond frame wall 53, and is adapted to receive and be fixed to the left-hand end of a short shaft 282. Shaft 282 has a reduced right-hand end portion (Fig. 6) journaled in bracket 283 secured to frame wall 53 by screws 284. As is best seen in Figs. 6 and 7, loosely mounted upon an annular shoulder 285, formed on clutch member 280, is a ratchet disc 286 having fixed thereto three stubs 287, upon each of which is rotatably mounted a roller 288 cooperating with a cam surface 290 on clutch member 280. Springs 291 located within holes 292 in clutch member 280, urge rollers 288 and ratchet disc 286 in a counter-clockwise direction (Fig. 15).

As has been described under the title "Light switch," the leading edge of a document rocks bell-crank 202 (Figs. 3, 7 and 11) just prior to reaching focal range 67 to illuminate the document. Arm 216 of bell-crank 202 has pivoted thereon a forwardly and downwardly extending link 293 (Figs. 3 and 7), having the forward end connected to arm 294 fixed to stub shaft 295. Stub shaft 295 is journaled in left-hand frame wall 53 (see also Fig. 8) and extends slightly beyond the inner face thereof where it carries pawl 296 adapted to normally engage teeth 297 on ratchet disc 286. It will be seen, therefore, that, while fingers 195 of cross bail 194 do not sense the presence of a document D, the bell-crank 202 (Figs. 3 and 11) is in its clockwise position due to the tension of spring 215 and thus pawl 296 engages teeth 297 of ratchet disc 286. Fingers 195 normally assume the position shown in Fig. 9 when a document is not being fed. Pawl 296 will be engaged with a tooth 297 on ratchet disc 286 for retaining said disc in a stationary position with rollers 288 in disengaged position relative to cam surfaces 290 and drum 300 (Fig. 15). Springs 291 will be held under compression and clutch member 280 will remain stationary so that film will not be fed.

A second clutch member 298 secured to shaft 78 (Fig. 6) has a drum 300 adapted to cooperate with rollers 288 on ratchet disc 286. From the above, it will be seen that, when the presence of a document is sensed by fingers 195, and pawl 296 is thus thrown out of engagement with teeth 297, springs 291 will rotate ratchet disc 286 slightly in a counter-clockwise direction (Figs. 7, 11 and 23) whereby the rollers 288 will be wedged between cam surface 290 and the inner periphery of drum 300 of the continuously rotating clutch member 298. In this manner clutch member 280 and shaft 282 are rotated in a counter-clockwise direction (Figs. 7 and 15).

Located between the ends of shaft 282 (Figs. 6 and 7) and secured thereto is a spiral gear 301 meshing with another spiral gear 302 secured to the forward end of a rearwardly extending tubular shaft 303. This shaft 303 is journaled at its forward end in bracket 283, and at its rear end in bracket 304 (Figs. 3, 4, and 25) secured to an upright frame plate 305. Located toward the rear end of shaft 303 and secured thereto is a spiral gear 306 which meshes with another spiral gear 307. The arrangement of the above gears is such that, when the shaft 282 rotates in a counter-clockwise direction (Fig. 3) as hereinbefore described, the gear 307 is rotated in a counter-clockwise direction. As is best seen in Fig. 25, the gear 307 is secured to a short shaft 308 journaled at about its center to the upright frame plate 305.

This plate 305 is secured by screws 310 to a U-shaped bracket 311, which in turn is secured to cross plate 60. The right-hand portion of shaft 308 (Fig. 25) is secured to a portion of an elongated hub 312 formed integral with a clutch member 313 (see also Fig. 26). The other portion of the hub is adapted to rotatably receive and support the left-hand end of shaft 314 having the right-hand end journaled in frame plate 315. Plate 315 is secured by screws 316 to U-shaped bracket 311. The clutch member 313 is provided with cam portions 317 for cooperation with individual rollers 318 disposed between said cam portions 317 and the inner periphery of a clutch member 320 secured to shaft 314. Springs 321 individual to said rollers 318 urge said rollers toward wedged engagement with said cam surface 317 and the inner periphery of clutch member 320. A friction disc 322 is provided concentric with shaft 314 and located adjacent the left-hand faces (Fig. 25) of said clutch members 313 and 320 to prevent said rollers 318 from lateral displacement.

It will be seen from the foregoing description, that when gear 307 is driven in a counter-clockwise direction, as viewed at Figs. 3 and 6, it rotates shaft 308 and clutch disc 313 in the same direction, as these members are all fixed to each other. As is best seen in Fig. 26 counter-clockwise movement of the clutch disc 313 will cause rollers 318 to be wedged between cam surfaces 317 and the inner periphery of clutch disc 320 and thus rotate clutch disc 320 and shaft 314.

The shaft 314 (Fig. 25) extends to the right beyond frame plate 315 and has secured thereto a coupling member 323 provided with one or more plungers 324 urged to the right under the pressure of compression springs 325 into engagement with notches 326 formed in another coupling member 327. Coupling member 327 (see also Figs. 33 and 34) is secured to shaft 241, also mounting friction drive wheel 240 for feeding the film F, said wheel 240 being an integral part of member 327.

In summation, soon after the presence of a document D is sensed by the fingers 195 (Fig. 7), the continuously rotating main drive shaft 78 is clutched to shaft 282, when gears 301 and 302, tubular shaft 303, gears 306 and 307 and clutch members 313 and 320 will rotate shaft 314 and coupling discs 323 and 327 to rotate shaft 241 and feed the film F in synchronism with the document D past the focal range 67.

Referring to Figs. 6 and 7, boss 281 of clutch disc 280 has a disc 328 keyed thereto formed with a V-shaped groove 330 about the periphery for cooperation with the wedge-shaped end portion of an arm 331 pivoted within the left-hand frame wall 53. Arm 331 (Fig. 7) is urged in a counter-clockwise direction into the groove of disc 328 by means of a spring 332, one end of which bears against frame wall 53 and the other end against the arm 331. The above construction is such that when pawl 296 is moved into engagement with teeth 297 of ratchet 286 to stop counter-clockwise movement of shaft 282, disc 286, cooperating with arm 331, prevents rebound movement of shaft 282 in a clockwise direction.

*Camera insertion, removal, and locking*

As has been previously described the present machine is enclosed within and rendered light-proof by a suitable casing 59. Referring to Fig. 1, it will be seen that casing 59 is provided with a cover 340 hinged at 341 (Fig. 32) across the rear edge for the purpose of enabling one to get at the several units of the machine without having to remove the entire casing.

The camera 68 is inserted in the machine through an opening formed in the rear end portion of cover 340 closed by a second cover 343 hinged at 344 to cover 340. As is best seen in Figs. 4 and 36, the base of camera 68 is provided with a pair of sockets 345 for receiving individual studs 346 secured to cross plate 60. These studs and sockets serve to locate the camera with respect to the machine and to insure proper alignment between the camera and the focal range.

Figure 35:
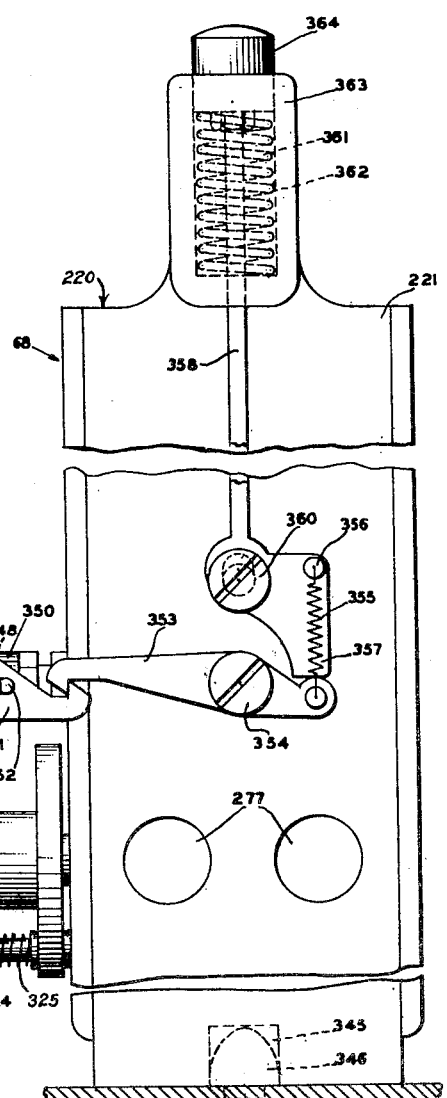
Fig. 35 is an enlarged fragmentary front elevation showing the camera and the latch mechanism for holding the camera in the machine.

After the camera is properly positioned in the machine, it is locked against displacement by means which will now be described. Referring particularly to Figs. 4 and 35, a latch member 351 is adjustably secured by means of screw 347 and slot 348, to extension 350, formed integral with frame plate 315. A pin 352, passing through slot 348 and secured to extension 350 serves to prevent rocking motion of latch member 351 about screw 347. The latch member 351 has a hooked portion at the right-hand end thereof (Fig. 35), which cooperates with a hooked portion on lever 353. Lever 353 is pivoted at 354 to front wall 221 of camera 68. Lever 353 is urged in a counter-clockwise direction, for cooperation with latch member 351 by means of spring 355, having one end connected to another arm of said lever 353, and the other end connected to a pin 356 secured to an actuating toe 357 of an upwardly extending rod 358. The rod 358 is mounted for vertical sliding movement on the front wall of the camera by means of a pin and slot connection 360, and is resiliently urged upwardly by a compression spring 361 disposed within a cylindrical cut-out portion 362 in an extension 363 formed on the camera housing. The upper end of rod 358 is provided with a finger piece 364 whereby the rod is manually depressed against the tension of spring 361. Upon depression of rod 358, actuating toe 357 engages lever 353 and rocks it in a clockwise direction to move its hook out of engagement with the hook portion on latch 351.

The camera is placed in its operative position, as seen in Fig. 35, by first positioning the camera at a slight angle, in a clockwise direction from that shown in Fig. 35, with notches 345 in register with studs 346, and with plunger 324 (Fig. 25) in register with one of the notches 326. In this slightly inclined position the hooks of latch 351 and lever 353 are disengaged. Movement of the camera into vertical position will then cause the lever 353 to be cammed in a clockwise direction, against the tension of spring 355, until the hook portion of the lever snaps into engagement with the hook of latch 351. When it is desired to remove the camera from its operative position finger piece 364 is first depressed, to disengage the hooks, and then the camera is rocked slightly in a clockwise direction to remove plungers 324 from notches 326.

*Auxiliary film feed*

As is well known in the art, a roll of film consists of a predetermined footage of opaque strip material at opposite ends of the roll usually called "lead strip." The central portion of the rol between the lead strips is formed of a photosensitized strip which is the part exposed to record the images. The l ad strips of a roll of film are provided for the purpose of winding and for protecting the photo-sensitive coating from exposure to light during the handling of the film.

In the present machine means are provided whereby lead strip is automatically fed through the camera to bring the leading end of the photo-sensitive strip into the camera and to feed the lead strip at the end over the exposed film.

Referring particularly to Figs. 2 and 4, the motor shaft 89 has secured thereon a second pulley 370, which drives a belt 371. Belt 371 in turn drives a pulley 372 fixed to a cross shaft 373. The cross shaft 373 is journaled at its right-hand end in a bracket 374 secured to the right-hand cross bar 52, and at its left-hand end in a forwardly extending bracket 375 (see also Fig. 3). The bracket 375 is formed integral with a U-shaped bracket 376 (Fig. 28) and is secured by screws 377 to a leftwardly extending ear 378 formed integral with plate 315. Toward its left-hand end shaft 373 has fixed thereto a gear 380 (Fig. 4), which meshes with gear 381 (Figs. 28 and 31). Gear 381 is mounted for rotation upon a shaft 382 journaled at its ends in the upright walls of U-shaped bracket 376. The right-hand face (Fig. 28) of gear 381 is formed with an annular recess 383 for receiving a flanged portion 384 of clutch member 385. Clutch member 385 is secured to gear 381 by rivets 386. From the above it will be seen that when the motor shaft 89 begins to rotate in a counter-clockwise direction (Fig. 3) gear 381 will be rotated in a clockwise direction.

Clutch member 385 is provided with an annular flange having teeth 387 formed thereon, which are adapted to cooperate with teeth 388 formed on a second clutch member 390. Clutch member 390 is rotatably mounted upon shaft 382. Located within the channeled portion formed by the annular flange of clutch member 385 and fixed to shaft 382 is a toothed wheel 391 (Figs. 28 and 30) having the teeth engageable with teeth 388. The construction is such that when teeth 388 are brought into engagement with teeth 387 by means to be described, teeth 388 being longer than teeth 387 (as best seen in Figs. 28 and 30) will lie in the path of the teeth on toothed wheel 391. It will be seen, therefore that, when clutch member 390 is brought into engagement with clutch member 385, the rotation of gear 381 will be transmitted through clutch teeth 388 to wheel 391 and thus rotate shaft 382 in a clockwise direction, as viewed in Fig. 3. The means for engaging clutch members 385 and 390 will now be described.

Referring to Figs. 3 and 32, the hinged cover or door 343 has secured to the underside thereof a U-shaped bracket having a downwardly extending arm 395, the lower end of which has pivotally mounted thereon a wipe pawl 396 resiliently urged in a counter-clockwise direction by a spring 397 and limited in such movement by a pin 398 secured to said arm 395.

Secured to the inside of casing 59 is an inwardly extending bracket 400, having a rock lever 401 pivotally mounted on the free end and urged, by means to be described, in a counter-clockwise direction. Lever 401 is limited in such movement by means of a pin 402 secured to bracket 400.

The arrangement of the above mechanism is such that when the cover is moved to open position (up), the wipe pawl 396 engages one arm of rock lever 401 and tends to rock it in a counter-clockwise direction. However, as pin 402 prevents such movement, the wipe pawl is rocked clockwise against the tension of spring 397 until the pawl is free from the rock lever at which time the pawl will snap back to its original position. When cover 343 is moved to closed position (down) the wipe pawl engages the rock lever and rocks the same in a clockwise direction until the rock lever is free from the pawl and snaps back to its original position.

Another arm 403 of the U-shaped bracket on cover 343 has pivotally mounted thereon a wipe pawl 404 similar in structure and arrangement to wipe pawl 396 with the exception that this wipe pawl 404 is adapted to cooperate with the other arm of rock lever 401. The wipe pawl 404 is urged in a clockwise direction by spring 405 and is limited in such movement by a pin 406 fixed to arm 403. The above arrangement is such that when cover 343 is moved to open position (up) wipe pawl 404 engages rock lever 401 and rocks it in a clockwise direction. However, when cover 343 is moved to closed position, wipe pawl 404 tends to rock the rock lever in a counter-clockwise direction but is prevented from doing so by pin 402. Continued movement of cover 343 to closed position will cause wipe-pawl 404 to wipe past rock lever 401 until it is free therefrom and then snaps back to its normal position. Arms 395 and 403 are formed of a single strip having an inverted U-shape as shown in Fig. 32.

It will be seen from the foregoing that wipe pawls 396 and 404 are effective to rock the rock lever in a clockwise direction only when cover 343 is being moved to closed and open positions, respectively.

Referring now to Figs. 3 and 26, a cable 407, having one end connected to one arm of rock lever 401, transmits the clockwise movement thereof to the rearwardly extending arm of a bell-crank 408 pivotally mounted upon a stud 410 secured to plate 315. A pair of rollers 411 rotatably mounted upon plate 315 act to guide the movement of said cable 407.

The other arm of bell-crank 408 extends downwardly to cooperate with the rear end of a forwardly extending plunger 412, guided within sleeve 413 (see Figs. 26, 28, 29 and 31) suitably secured to an ear 414 bent at right angles and formed integral with plate 315. The forward end of plunger 412 is adapted when moved by bell-crank 408 to engage and rock a cam plate 415 forwardly about a pin 416. The pin 416 is fixed at its ends to a pair of ears 417 formed integral with a crank arm 418 pivoted to a stud 420 secured to ear 414 of plate 315. A spring 421 coiled about pin 416 and having one end bearing against crank arm 418 and the other end bearing against cam plate 415 serves to urge said cam plate in a rearward direction (to the right in Fig. 29).

A spring 422 (Figs. 26 and 29) coiled about stud 420 and having one end bearing against ear 414 and the other end bearing against crank arm 418 serves to urge the crank arm and cam plate 415 pivoted thereon, in a clockwise direction as viewed in Fig. 28. The crank arm 418 extends downwardly and is bifurcated to form a pair of arms 423, which are diametrically disposed within an annular groove 424 formed on a hub 425 integral with clutch member 390. Secured to the right-hand end of shaft 382 (Fig. 31) is a worm 426, which meshes with a worm wheel 427 rotatable upon a stub shaft 428 secured to ear 414. A pin 430 secured to worm wheel 427 normally lies in the path of the lower edge 431 of cam plate 415.

The arrangement is such that when pin 430 lies in its uppermost position, as seen in Figs. 28 and 29, it holds the cam plate and the crank arm assembly in a counter-clockwise position against the tension of spring 422, in which position the teeth on clutch members 385 and 390 are disengaged. When the plunger is moved to the right as hereinbefore described (Fig. 26) cam plate 415 (Fig. 28) is cammed forwardly about pin 416 and out of the path of the free end of pin 430. When this occurs, it will be seen that spring 422 will immediately take effect and move crank arm 418 and cam plate 415 in a clockwise direction (Fig. 28) about stud 420 and thus move teeth 388 of clutch member 390 into engagement with the teeth of clutch member 385, as will be seen in Fig. 31.

As was previously described when clutch members 385 and 390 are moved into engaged position, the elongated teeth 388 of clutch member 390 will lie in the path of the teeth of toothed wheel 391 (Fig. 30) to rotate shaft 382. Rotation of shaft 382 will cause worm 426 to rotate worm wheel 427 in a clockwise direction (Fig. 28) carrying pin 430 clockwise away from cam plate 415 until near the end of a cycle of movement of worm wheel 427, when pin 430 will engage cam plate 415 which has returned to its rearward position in the path of said pin, and moves said cam plate and crank arm in a counter-clockwise direction against spring 422 disengaging clutch members 385 and 390. A fly wheel 389 mounted on shaft 382 provides for additional rotation of shaft 382 after the clutch members are disengaged to bring pin 430 back to its initial starting position.

Suitably secured to the flanged portion of clutch member 390, is a gear 432 (Figs. 3, 4, and 25) in mesh with a larger gear 433 fixed to shaft 434 located directly behind shaft 382. The shaft 434 (Fig. 25) is journaled at its ends in plates 305 and 315 and has secured thereto, a smaller gear 435 which meshes with gear 436 rotatably mounted upon stud 437 secured to plate 315. The gear 436 meshes with another gear 438 loosely mounted upon the outer periphery of clutch member 320, as best shown in Figs. 25 and 26. The friction disc 322, previously described, and another disc 440 secured by rivets 441 to clutch member 320 serves to prevent lateral displacement of gear 438. Clutch disc 320 is provided with three cam surfaces 442 (Fig. 26) for cooperation with individual rollers 443 located between cam surface 442 and the inner periphery of gear 438. Springs 444 urge rollers 443 into wedged relation between the cam surfaces 442 and the inner periphery of said gear 438.

The above construction is such that clockwise rotation of the gear 432 will, through gears 433, 435, and 436, rotate gear 438 in a counter-clockwise direction. When gear 438 is rotated in a counter-clockwise direction rollers 443 (Fig. 26) will be forced into wedged engagement between cam surfaces 442 and the inner periphery of gear 438, thus rotating clutch member 313, which through shaft 314 feeds the film as above described.

It will be noted at this time that the ratio between the motor shaft 89 and shaft 314 is such that approximately four feet of unexposed film or lead strip is automatically fed each time clutch teeth 387 and 388 are brought into engaged position by the operation of cover 343 to open or closed positions. It will also be noted that shaft 314 (Fig. 26) is driven independently, either through main shaft 78 or through shaft 382. Accordingly, in order to prevent chattering or banding caused by an idle clutch mechanism while the other is operated, the following frictional means is provided.

Figure 27:
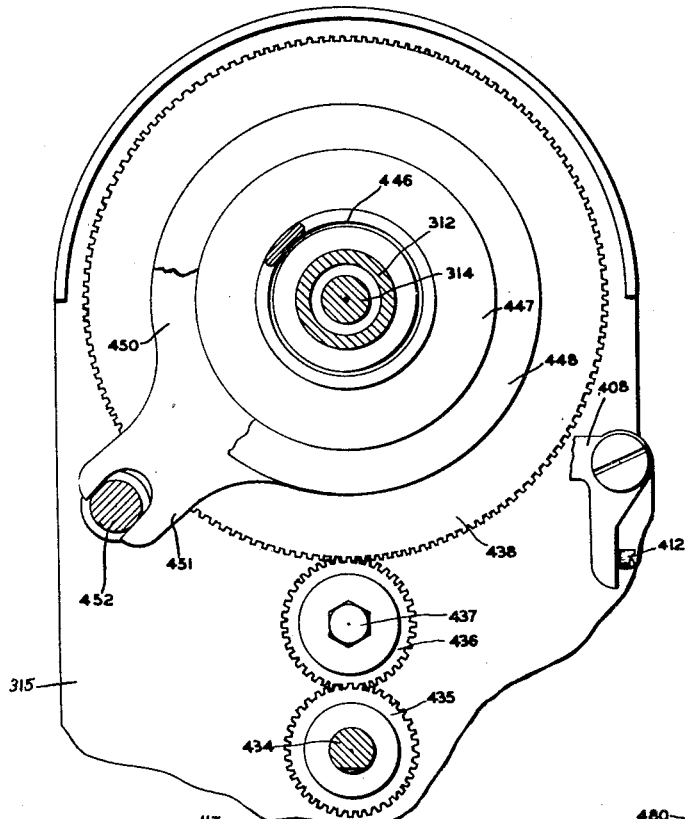
Fig. 27 is a cross section taken substantially along the line 27—27 of Fig. 25, disclosing the arrangement of the friction discs of the film feed drive mechanism.
Figure 24:
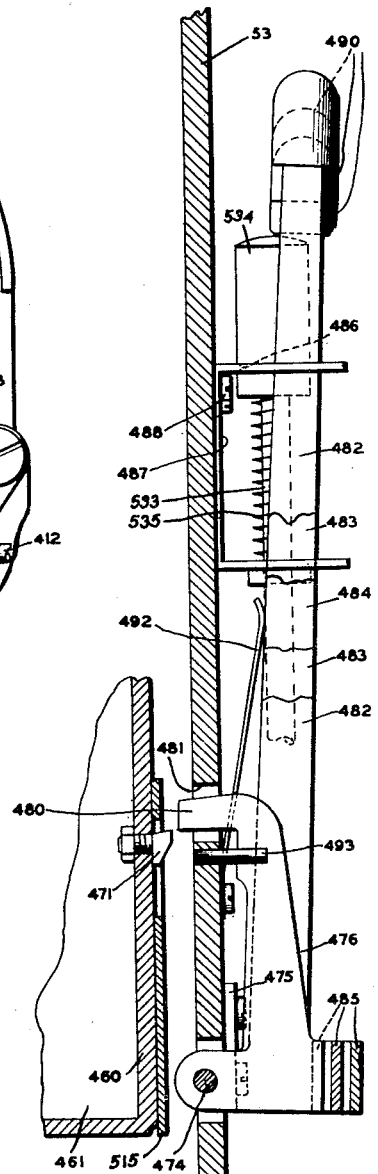
Fig. 24 is an enlarged cross section taken substantially along the line 24—24 of Fig. 3, showing the mechanism for stopping the indexing drum in a preselected position where the date, location, and counter units may be set.

Referring to Figs. 25, 26, and 27, the hub 312 of clutch disc 313 has fixed thereto a collar 445 against which bears one end of compression spring 446. The other end of spring 446 bears against a friction plate 447 slidably mounted upon hub 312. Rotatably mounted upon hub 312 is a friction disc 448 against which bears friction plate 447. Located between the inner walls of friction discs 322 and 448, is a stationary plate 450 concentric to hub 312, and formed with an extension 451 (Figs. 3 and 27) bifurcated at its end to receive and be held against rotation by a shaft 452 fixed at its ends to plates 305 and 315. Rings 453 are suitably glued or otherwise secured to each side of plate 450 and cooperate with the inner faces of friction discs 322 and 448. Rings 453 are made of frictional material such as felt. Three studs 454 are secured to clutch member 313 and extend to the left therefrom (Fig. 25) and pass through clutch discs 322, 443, plate 450, and terminate in individual openings or notches 455 in friction plate 447.

The construction is such that, when clutch disc 313 is rotated, parts 445, 446, 447, 448, and 322 are rotated with it.

*Document indexing*

It has been previously described that before the documents are fed through the present machine, they are first arranged in groups, each document in a group having a like identifying characteristic. For example, assuming that the documents to be photographed are bank checks, the checks may be arranged in groups according to the name of the bank to which the checks are made out or they may be arranged in groups according to the location where the checks are to be distributed.

Accordingly, when it is desired to project on a screen, a photographed check belonging to a particular group, it is necessary to first locate that group of checks and then find the desired check.

In the present machine, an indexing device is provided whereby a series of like identifying data is exposed to one side of the film during the photographing of each group of documents so as to enable one to more easily locate a particular group of documents when the exposed film is projected on the screen.

The indexing device consists of three units, namely, the "number" unit, the "location" unit, and the "date" unit. The "number" unit is adapted, during the photographing operation of the machine, to display a number identifying the name of the bank to which the checks of a particular group are made out, the "location" unit is adapted to display the location where a group of checks are to be distributed and the "date" unit is adapted to display the date that the group of checks has been photographed.

The "number," "location" and "date" units, generally designated by the reference numerals 456, 457, and 458, respectively, are mounted upon the inner face of wall 460 of rotatable drum 461 (Figs. 6 and 14). Drum 461 is located between wall 70 of stationary cylinder 66, and frame wall 53. Wall 460 of drum 461 is recessed inwardly to form a cup-shaped portion 462 adapted to receive and be concentrically supported by the periphery 300 of the clutch member 298. The hub of clutch member 298 passes through opening 464 in flange 463 of cup-shaped portion 462.

The drum 461 may be prevented from rotation at any one of three positions for the purpose of changing or altering the identifying data displayed by the "number," "location," or the "date" unit. Referring now to Figs. 3, 4, 7, 14, 15, and 24, wall 460 of drum 461 has three outwardly extending lugs 471, 472, and 473 secured to the right-hand face thereof (Figs. 15 and 24) which are positioned radially at varying distances from the center of said wall 460. Three upwardly extending arms 476, 477, and 478 are located to the right of frame wall 53 and pivotally mounted upon a shaft 474, journaled at its ends in a pair of brackets 475. Each of the arms 476, 477 and 478 have a laterally extending projection 480 formed at the upper end thereof extending through and slightly beyond an opening 481 formed in frame wall 53.

The above construction is such that when arm 476 is rocked in a counter-clockwise direction (Fig. 24), by means to be described, its projection 480 is moved into the path of its associated lug 471 to stop drum 461 in a position wherein the identifying data displayed by the "number" unit may be changed or altered. When arm 477 is rocked its lateral projection 480 is moved into the path of its associated lug 472 to stop drum 461 in a position wherein the identifying data displayed by the "location" unit may be changed or altered. When arm 478 is rocked its lateral projection 480 is moved into the path of its associated lug 473 to stop drum 461 in a position whereby the identifying data displayed by the "date" unit may be changed or altered.

The lateral projections 480 are selectively rocked into the path of lugs 471, 472, and 473 by the following means. Pivotally mounted upon shaft 474 are three upwardly extending arms 482, 483, and 484 which are individually connected to the arms 476, 477, and 478, respectively, by means of cross bars 485. The upper ends of arms 482, 483, and 484 pass through individual slots 486 (Fig. 4) formed in the upper arm of a U-shaped bracket 487 secured by screws 488 to frame wall 53, and terminate in finger pieces 490. The slots 486 are shouldered at 491 (Fig. 4) in such a manner that when any one of the arms 482, 483, and 484 is manually rocked in a clockwise direction as viewed from the front of the machine, to move its corresponding projection 480 into the path of its associated lug, it may be retained in that position by moving the arm into engagement with shoulder 491. Springs 492 (Fig. 24) secured to frame wall 53 serve to urge arms 482, 483, and 484 in a clockwise direction. The arms 476, 477, and 478 are prevented from lateral displacement by means of a pin 493 (Fig. 24) secured to frame wall 53.

Referring particularly to Figs. 14, 16, and 17, the "number" unit 456 consists of a counter of the Veeder type, having four indicator wheels 494 with numerals from 0 to 9 on the periphery of each. The indicator wheels are mounted for rotation upon a main shaft 495, the left-hand end of which (Fig. 16) is journaled in an L-shaped bracket 496 secured by screws 497 (Figs. 14 and 17) to a bracket 498, which, in turn, is secured to the inner side of wall 460 by screws 500. Formed integral with wheel 494 of lowest order is a ratchet wheel 501 having teeth 502 for cooperation with a pawl 503.

The pawl 503 is rotatably mounted upon a stud 504 fixed to a rockable plate 505 mounted for rotation upon the hub of ratchet wheel 501. A spring 506 having one end thereof connected to an arm 507 of pawl 503 and the other end connected to arm 508 on rockable plate 505 serves to urge pawl 503 in a counter-clockwise direction (Fig. 17) and into cooperative engagement with teeth 502 of ratchet wheel 501. A pin 510 fixed to bracket 498 is adapted to cooperate with a shoulder 511 on pawl 503 in such a manner that when rockable plate 505 is in its clockwise position (Fig. 17), pin 510 prevents pawl 503 from moving into engagement with the teeth in ratchet wheel 501. When plate 505 is rocked in a counter-clockwise direction, by means to be described, shoulder 511 is moved away from pin 510 permitting spring 506 to take effect and rock the pawl into engagement with teeth 502. Further counter-clockwise movement of plate 505 will cause the pawl to rotate the ratchet in the same direction.

In order to prevent overthrow of ratchet wheel 501, a spring operated detent 512 is provided which detent is pivoted upon a stud 513 secured to bracket 498. It will be noted at this time that the numerals on the indicator wheels 494 are displayed through an opening 514 (Fig. 14) formed in drum 461. When the drum is rotated, in a manner hereinbefore described, the indicator wheels 494 are moved through the focal range 67 whereby the number indicated by the number unit is in position to be exposed to the film once for each complete revolution of drum 461.

Referring to Figs. 6, 7, 14, and 15, a ratchet ring 515 is seated upon the right-hand side (Fig. 6) of wall 460 and in an annular concentric channel and has teeth 516 formed about a limited portion only of its periphery. Ring 515 is mounted upon wall 460 by means of three studs 517 suitably secured to said ring. The studs pass through individual concentric slots 518 formed in wall 460. A spring 520 (Fig. 14) having one end connected to one of said studs 517 and the other end connected to a pin 521 fixed to drum 461 serves to urge said ring in a clockwise direction (Figs. 7 and 15). The rockable plate 505 has fixed thereto an outwardly extending stud 522 (Figs. 15, 16, and 17), which passes through an arcuate slot 523 in bracket 498 and a similar slot in wall 460 and terminates in a radial slot 524 formed in ratchet ring 515 (Fig. 15). The construction is such that, counter-clockwise movement of ratchet ring 515 (Figs. 7 and 15) will rock plate 505 (Fig. 17) in a counter-clockwise direction to cause one to be added in the wheel 494 of lowest order.

As has been described, the operation of arm 482 moves the lateral projection of its corresponding arm 476 into the path of its associated lug 471 to stop the drum in a position wherein the data on the "number" unit may be changed or altered. In this position teeth 516 of ring 515 are in alignment with and engageable by feed pawl 525 as shown in Fig. 7. The pawl 525 is loosely mounted upon an arm 526 secured to a short shaft 527 journaled in frame wall 53. A spring 528 having one end connected to the pawl 525 and the other end connected to a pin 530 fixed to wall 53 serves to urge the pawl in a counter-clockwise direction (Fig. 7) into engagement with teeth 516. A second pin 531 fixed to the frame 53 limits the counter-clockwise movement of pawl 525.

Shaft 527 extends through frame 53 and has secured at the other end another arm 532. Arm 532 is connected to the lower end of an upwardly extending rod 533 (see also Fig. 3). The upper end of rod 533 passes through the lower arm of the U-shaped bracket 487 and terminates in a finger piece 534 guided against lateral displacement in the upper arm of the U-shaped bracket 487. A spring 535 coiled about the rod 533 having one end bearing against the lower arm of the U-shaped bracket and the other end bearing against the lower portion of the finger piece 534 serves to urge rod 533 in an upward direction and pawl 525 out of engagement with teeth 516 of ring 515. The construction is such that the depression of rod 533 will raise pawl 525 into engagement with teeth 516. Continued upward movement of pawl 525 will rotate ring 515 a distance of one unit to add one to the number shown by the unit.

The means for returning the indicator wheels 494 so that they register zeros is as follows: Suitably secured to frame wall 53 (Figs. 4, 6, and 16) is an outwardly extending tubular support 536 slidably and rotatably mounting shaft 537. Secured to the right-hand end (Fig. 16) of shaft 537 is a knob 538 whereby the shaft may be rotated and moved axially within the support 536. The shaft 537 is formed at its left-hand end with a coupling element 539, adapted to be received in slots 540 formed in the hub of ratchet member 501. A spring 541 serves to urge shaft 537 towards the right (Fig. 16) to disengage coupling element 539 from slots 540. When it is desired to return the indicator wheels 494 to zero position, shaft 537 is moved to the left (Fig. 16) against the tension of spring 541 to bring the coupling element 539 into engagement with slots 540. The shaft 537 is then rotated through the knob 538 for returning the indicator wheels to zero position.

Referring to Figs. 14, 18, and 19, the "location" unit 457 consists of a pair of side plates 545 suitably spaced apart by spacer sleeves 546 and fixedly mounted upon the inner side of the wall 460 by means of bolts 547. The plates 545 support a pair of shafts 548 upon each of which is rotatably mounted a flanged roll 550 adapted to carry a continuous tape 551 having imprinted thereon the names of different locations, only one of which is displayed at one time through an opening 552 formed in drum 461. Tape 551 is notched at 553 to receive teeth 554 formed on the periphery of sprocket 555 secured to shaft 556 journaled at its ends in side plates 545. Secured to the right-hand end (Figs. 18 and 19) of shaft 556 is a slotted coupling element 557 which, when drum 461 is prevented from rotation by the operation of arm 483 as above described, is in alignment with the coupling element 539 (Fig. 16) on shaft 537. With the parts in this position, the name of the location displayed through opening 552 may be changed by engaging the coupling elements 539 and 557 and rotating shafts 537 and 556 through the knob 538. A spring 558 mounted upon two of the sleeves 547 at one end and bearing against sprocket 555 at the other end serves to prevent overthrow of the sprocket.

The "date" unit 458 consists of a pair of side plates 560 (Figs. 14, 20, and 21) suitably spaced apart by tie rods 561 and fixedly mounted upon the inner side of wall 460 by means of bolts 562. Plates 560 support a pair of shafts 563 upon each of which is rotatably mounted three rolls 564, adapted to carry respective continuous tapes 566, 567, and 568. The tapes 566, 567, and 568 have imprinted thereon the designations to indicate the month, day and year, respectively. Drum 461 is provided with a slot 570 through which only one month, day and year is displayed. Each of the tapes 566, 567, and 568 is provided with holes 571 adapted to receive teeth 572 formed on the periphery of respective sprockets 573, 574, and 575. The sprockets 573 and 575 are rotatably mounted upon a shaft 576 while sprocket 574 is keyed to said shaft. Secured to the right-hand end (Figs. 20 and 21) of shaft 576 is a slotted coupling element 577 which, when the drum 461 is prevented from rotation by the operation of arm 484 as above described, is in alignment with coupling element 539 on shaft 537. With the parts in this position the day imprinted on tape 567 and displayed through slot 570 may be changed by engaging the coupling elements 539 and 577 and rotating shafts 537 and 576 through knob 538. The months and years may be manually changed without the use of the knob 538. A spring 578 mounted upon two of the tie rods 561 at one end and bearing against sprockets 573, 574, and 575 serves to prevent displacement of said sprockets.

Buzzer control

In order that the operator may at all times during the operation of the machine be certain that both films F are properly fed from the supply to the receiving spools, the following signaling mechanisms are provided. Secured to the lower rear portion of partition 223 and extending right and left therefrom is a shaft 585 having pivotally mounted upon each end portion (Fig. 34) a forwardly extending arm 586, the forward end of each carrying a roller 587. A spring 588 for each arm has one end bearing against the bottom wall of the camera and the other end against the arm and serves to urge the arm in a counter-clockwise direction whereby roller 587 engages film F on supply spool 224. Secured to each arm 586 and concentric with shaft 585 is a gear sector 590 which meshes with gear 591 secured to a stub shaft 592 journaled in bracket 593 secured to rear wall 222 of the camera. Adjacent the outer side of bracket 593 and fixed thereto is an indicating disc 594 through which shaft 592 passes. The shaft 592 has a pointer 595 mounted on its outer end. The outer face of indicating disc 594 is provided with graduations so that as the film is fed from supply spool 224, arm 586 will gradually rotate in a counter-clockwise direction, causing pointer 595 to indicate the amount of film left on the supply spool.

Figure 37:
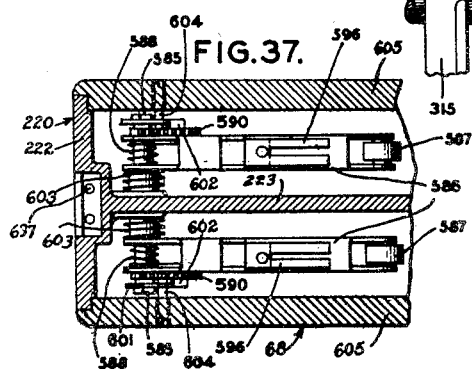
Fig. 37 is a horizontal cross section taken substantially along the line 37—37 of Fig. 33.

The arm 586 is further used to signal the operator when the supply spool 224 is empty. Secured to the center portion of arm 586 is spring contact member 596, which, when the spool is empty, and the arm is rotated to an upright position by spring 588, will engage a pair of contacts 597 (Fig. 33) disposed in a block 598 of insulating material, which block is secured to rear wall 222. When this occurs a circuit is closed whereby a buzzer 600 (Fig. 39) is operated, to signal the operator that the supply spool is empty. Secured to each end of shaft 585 adjacent sector 590, is a latch 601 (Figs. 33 and 37) having an inwardly extending lug 602, which is adapted to engage in a slot in sector 590 and retain the sector and arm in its furthest clockwise position to permit insertion and removal of supply spools 224 and 230.

Coiled about shaft 585 and located between arm 586 and the partition 223 is a compression spring 603, one end of which bears against the arm 586 and the other against the partition 223. The spring 603 serves to urge the arm axially toward the free end of shaft 585 and into cooperative engagement with lug 602 (after the insertion or removal of the supply spool is effected). A stud 604 secured to and extending inwardly from the lower corner of each cover 605 hinged to rear wall 222 of the camera engages sector 590 at its side of the camera when said cover is closed to move said arm axially against the tension of spring 603 until the arm and sector move out of the path of lug 602. When this occurs spring 588 takes effect and rocks arm 586 and sector 590 thereon in a counter-clockwise direction until roller 587 engages film F on supply spool 224 or 230 respectively. The film footage indicator and buzzer control is duplicated for each film so as to operate independently as indicated by the above description.

Fixed to partition 223 and extending right and left therefrom is a shaft 610 (Fig. 33) having pivotally mounted on each end portion thereof an arm 611 urged in a clockwise direction by a spring 612 so that a roller 613 mounted in the upper end bears against the portion of the film between the supply spools 224 and 230 and the rolls 237 and 250 respectively. Each arm 611 operates independently of the other. A spring contact member 614 is fixed to arm 611 and is adapted when said arm is rocked in a clockwise direction to engage contacts 615 to close a circuit to operate buzzer 600, previously described.

The ends of shaft 610 have latches 616 mounted thereon similar in construction and operation to latches 601. A compression spring, not shown, but similar to spring 603 is provided on each end of shaft 610 to urge each arm 611 into cooperative relation with the lug on a latch 616 when said arm is in its full counterclockwise position to permit independent removal and insertion of films F around rolls 237 and 250. The arm 611 is moved out of the path of the lug on latch 616 by means of a second stud similar to stud 604 secured to the lower left-hand cover 605. One lug is secured to each cover for independently operating its corresponding arms 611.

The above construction is such that, should a breakage in the film occur between the supply spool 224 or 230 and roll 237 or 250, the respective arm 611 will be rocked clockwise, due to the tension of spring 612, to close contacts 615, thereby signaling the operator that the film is not being properly fed through the camera.

Located at the upper portion and toward the rear of central partition 223 is a shaft 620 (Figs. 33 and 34) secured to said partition and extending left and right therefrom. Pivotally mounted upon opposite ends of shaft 620 are downwardly extending arms 621, the lower ends of which carry rollers 622. Each roller is adapted to ride on the film F at one side of partition 223 in the receiving spools 255 and 261 respectively, under tension of springs 623, one for each arm, one end of each spring bearing against rear wall 222 of the camera, the other end of each spring bearing against one arm 621. Each arm 621 has mounted at its rear portion, a spring contact member 624 (Fig. 33) which, when arm 621 is moved to its full clockwise position, engages and closes a pair of contacts 625, whereby a circuit is closed to operate the buzzer 600. Latches 626 similar in construction and operation to latches 601 and 616 act to hold the arms 621 in their full clockwise position and are so arranged that, when studs on the upper corners of upper covers 627 engage arm 621, the arm is moved inwardly toward partition 223 against the tension of a spring 628 similar to the spring 603 to move said arm out of the path of the lug on latch 626. When this occurs, springs 623 will take effect and urge rollers 622 against the respective film F in receiving spools 255 and 261 respectively. From the above it will be seen that the contacts 625 will not be closed by contact members 624 until the time that either the receiving spool 255 or 261 has a sufficient amount of film wound thereon.

It will be noted that at this time the contacts 597, 615, and 625, are mounted on the camera and are used when the machine is in operation to operate buzzer 600, when the supply spools are empty, when a breakage of the film occurs, or when the receiving spools are full. These contacts are not connected to the operating circuit until the camera is in its inserted position in the machine.

Referring to Figs. 33 and 36, the following means are provided for connecting the camera with the operating circuit, when the camera is in its full inserted position. A terminal block 636 of insulating material is secured to rear wall 222 of the camera by a screw 635. A pair of contact members 637 is mounted in terminal block 636 and protrudes slightly beyond the lower face of block 636. Contacts 637 are adapted when the camera is inserted in the machine as hereinbefore described to engage a second pair of contact members 638. The upper portions of each of the contact members 638 are disposed within cutout portions in terminal block 640 and extend downwardly through a pair of shouldered sleeves 641 secured to block 640. The conductors from the operating circuit are connected to sleeves 641. Compression springs 642, one for each sleeve, serve to urge the contact members 638 into engagement with contact members 637. The above construction is such that the camera, when inserted in the machine, is brought into proper alignment with the focal range, and contact members 637 are brought into engagement with contacts 638 to connect contacts 597, 615, and 625 with the operating circuit, as will presently be described.

Referring to Figs. 4 and 25, the upper portion of plate 315 has a plunger 650 mounted thereon with one end extending to the left of said bracket and the other end to the right, for engagement with and pushed by the upper left-hand cover 627 of the camera, when said camera is inserted in its operating position to open a pair of contacts 651 mounted upon plate 315. The plunger is urged to the right (Fig. 25) by means of a spring 652, one end bearing against plate 315 and the other against a shoulder on plunger 650, so that when the camera is not in its inserted position, the contacts 651 are in a closed position. This will insure that the buzzer 600 is connected to the operating circuit as shown in Fig. 39 when the camera is not in the machine to cause the buzzer to signal the absence of the camera.

*Circuit diagram*

Referring to Fig. 39, the present machine utilizes four separate and distinct circuits connected to the power supply line indicated by reference numerals 655 and 656 under control of a main switch 657. The first of said circuits is connected in parallel with the main line to operate motor 52 when switch 658 is closed. Switch 658 is mounted on the upper front portion of casing 59 as shown in Fig. 1. A pilot light 669, connected in the motor circuit, is provided to signal the operator whenever the motor is running. This pilot light is mounted adjacent to switch 658 and is shown in Fig. 1.

The second circuit includes a voltage control unit 661 utilizing electronic tubes of a character well known in circuits of this type. Lamps 185 are connected to said voltage control unit 661 in parallel, the circuit being under control of contacts 205 and 206.

The third circuit is a low voltage circuit operating through transformer 662, the primary of which is connected directly to power supply lines 655 and 656, while a six-volt secondary is connected to buzzer 600 and its controls. The buzzer is controlled by contacts 597, 615, and 625, connected in parallel with respect to each other but connected in series with buzzer 600 so that, when any of the above contacts is closed, the buzzer will operate. Previously described contacts 651 are connected in parallel relative to the other contacts in the circuit so that, when the camera is inserted in the machine, the contacts are open to put the buzzer under control of contacts 597, 615, and 625. When the camera is out of the machine, contacts 651 are closed to put the buzzer in operation under control of main switch 657.

The fourth circuit is for controlling the operation of solenoid 108 which, when it is energized, stops the document feeding mechanism.

Referring to Fig. 28, crank arm 418 has an arm 665 mounted thereon extending downwardly to engage a contact 666 to close a circuit to solenoid 108 when said crank arm is rocked in a clockwise direction as hereinbefore described. It will be seen from Fig. 39 that, when contacts 665 and 666 are engaged as above described, i. e., when the four foot film feed mechanism is in operation, solenoid 108 is energized to prevent feeding of a document. A pair of contacts 667 (Figs. 1 and 39) is provided which may be closed from the keyboard of the machine to energize solenoid 108 whenever the operator deems it necessary to stop the feeding of a document.

It will be noted that the micro switch 188 and contacts 666 and 667 are in parallel with each other and in series with solenoid 108 for independent operation of the solenoid.

It often becomes necessary that different groups of documents may be photographed upon the film with a space of unexposed film between the different groups or a predetermined space between the different documents fed through the machine. For this reason, mechanism is provided whereby the film drive mechanism is operated independently of the document feeding mechanism.

Referring to Figs. 3 and 4, located to the left of the upright frame wall 53 and secured thereto is a U-shaped bracket 670, upon which is mounted for vertical movement a plunger 671 resiliently urged in an upward direction by a spring 672. The plunger 671 is connected at its lower end to the forwardly extending arm of a lever 673, pivotally mounted upon the frame wall 53. The rearwardly extending arm of lever 673 is connected to the upper end of a link 674 mounted for vertical movement at its lower end upon a pin 675 engaged in slot 676 therein. Located beneath and in the path of the arm 204 of bell-crank 202 is a pin 677 adapted when the link 674 is raised, through operation of plunger 671, to rock the bell-crank in a counter-clockwise direction (Fig. 3) to engage the clutch members 280 and 298 in a manner previously described, to start the operation of the film feed drive mechanism.

*Operation*

The present invention is particularly adapted for use in the photographing of bank checks and statements although it is equally adaptable for use in photographing other types of documents. Various sizes of documents can be photographed in the present machine, the limit of size being determined by the dimension of the document in one direction only because the capacity of this machine is limited only by its width, particularly the width of the throat 62 and the length of stationary cylinder 66. The transverse dimension of the document as it is fed into the machine is, therefore, the only controlling factor on the size of document that can be photographed in the machine while the dimension of the document in line with the direction of feed can be any length. This result is obtained in a manner that will be clear from the following description of the machine's operation.

It is first necessary to provide a camera with a roll of film. A duplex camera is disclosed in the drawing adapted for taking two photographs of the same document simultaneously. However, only one photograph will be taken if the camera is loaded with only one film. The camera is loaded with film in the manner as disclosed in Figs. 33 and 34 as hereinbefore described. When the covers are closed arms 586, 611 and 621 are set in their respective positions as illustrated in Fig. 33. In loading the camera the lead strip on the film from the supply spools is attached to the receiving spools 255 and 261, respectively. The camera is then ready for insertion into the machine.

The machine is attached to a suitable source of current supply controlled by a main switch 657 and control switch 658 is manually operated to the "on" position starting motor 58 and energizing pilot light 60. Cover section 343 is then lifted to the open position. The opening movement of cover section 343 will cause pawl 396 to wipe past rock lever 401 while pawl 404 will operate rock lever 401 in a clockwise direction as shown in Fig. 32 moving cable 407, bell crank 408 thereby setting the lead strip winding mechanism shown in Figs. 20, 29 and 30 into operation in the manner hereinbefore described through the movement of cam plate 415 to secure one cycle of operation of this mechanism.

If no camera happens to be in the machine, buzzer 600 will have been operated continuously since switch 658 has been turned to the "on" position by reason of contact 651 being engaged through the absence of a camera to close the circuit to buzzer 600.

The camera is then inserted in the casing with studs 346 engaged in sockets 245 as hereinbefore described and illustrated in Figs. 2, 35 and 36. When the camera is moved into the vertical position shown in Fig. 35 lever 353 engages latch member 351 and locks the camera in position ready for operation. At the same time, plunger 650 is operated by the camera to disengage contacts 651 and discontinue the operation of buzzer 600. Contacts 637 in terminal block 636 are also brought into engagement with contacts 638 when the camera is engaged with studs 346 to insert control switches 597, 615 and 625 in circuit with buzzer 600 for closing the buzzer circuit in case of film breakage and upon the supply spools being emptied and the receiving spools being filled.

Cover section 343 is now moved to closed position. This cover closing will cause pawl 396 to operate rock lever 401 in a clockwise direction as shown in Fig. 32 for again operating cable 407 to rock cam plate 415 and thereby release the lead strip feed mechanism to secure a cycle of operation thereof for feeding the lead strip on the film carried by the supply spools in the camera, through the camera onto the receiving spools so as to place the sensitized film in position for photographing of documents thereon. The camera is the type having a slot type aperture designed for producing a photographic negative of a document called a "micro-photograph," due to the reduction of the photographic image of the document to about one-seventeenth to one-thirtieth of its actual size.

The operator of the machine then takes a group of checks to be photographed and places them on feed table 61. The "number," "location," and "date" units are then set by the operator for the desired indication of the bank number, the location number and the date. Drum 461 is stopped in each of its three positions for these three units by the operation of finger pieces 490 so that the operator can turn knob 537 in the successive setting of each unit until the desired indicia on each of the units is shown through the corresponding slot in drum 461. The operator observes the setting of these units through the transparent plate forming part of table 61. Table 61 may be conveniently removed from the machine for manual setting of the month and year bands in date unit 458.

Tray 143 is adjusted to receive the discharged documents.

The operator is now ready to proceed with the feeding of the documents into the machine for photographing. Checks are fed into throat 62 while pivoted closure plate 680 in Fig. 1 is moved to the position illustrated for closing entrance into the machine directly rearwardly along the feed table. The operator holds a pile of checks in one hand and proceeds to feed them into throat 62 one at a time in successive order as rapidly as the checks may be manually fed.

The checks are fed so the top edge of the check becomes the leading edge with the face of the check upwardly and facing toward the camera as it passes through the photographing plane. The check first engages the top feed roller 76 on one of shafts 74 and the single center roller 113 as shown in Fig. 10 where it is fed into the straightening device for engagement of the leading edge with fingers 176 to straighten the position of the check in the machine. The check is now gripped between single roller 113 and feed roller 76 and positively fed to the left as shown in Fig. 9 about stationary cylinder 66 under the upper guide unit on the inside of plate 63.

The leading edge of the check in this feeding operation next engages roller 191. This roller operates lever 190 of the mechanism for preventing the feeding of two checks or other documents simultaneously. Therefore, in the event two thicknesses of paper such as two checks engage this roller 191 in overlapped relation, lever 190 is operated to a sufficient extent to close micro-switch 188, energize solenoid 180, and disengage the clutch driving feed rollers 75 and 76. Since this stops the feeding of two documents at the feed end of the machine, the length of a check from the top to the bottom edge thereof is sufficient for the trailing edge or bottom of the document to be manually engageable in throat 62 so that it may be withdrawn manually from the machine. As soon as the removal of the two documents is obtained or at least one of them, the machine is then set in operation again to feed checks toward photographing position.

The leading edge of the check next engages fingers 195 for rotating shaft 193 which in turn operates film crank lever 202 in a counter-clockwise direction as illustrated in Fig. 11 engaging contacts 205 and 206 for closing the light circuit and illuminating lamp bulbs 165. The operation closes the lamp circuit as soon as fingers 175 have moved only a short distance of its complete arc of travel and before the leading edge of the document reaches the photographing position. As the leading edge of the check or other document reaches the photographing plane 67 immediately in the rear of glass plate 144, the lamps 165 are lighted to full brilliancy. The operator may at this point observe whether all of the lamps are lit and the document is being properly fed by looking at instrument board 218. The observation also indicates when the document has reached and is passing through the photographing position, and when it leaves the photographing position.

Immediately after the circuit to lamps 165 is closed, bell crank 202 is operated to a further extent to move clutch member 280 to drive shaft 303 and move the film in the camera through the film drive mechanism hereinabove described. The moving of the film begins as the leading edge of the document reaches the photographing field 67 and continues during the movement of the document through the photographing field. The movement of the document and the film is such that the surface speed of each is proportionate and in opposite directions so that the image of the check passing the aperture slot in the camera is photographed onto the film.

As the trailing edge of the document approaches the photographic field 67, the ends of fingers 195 drop off of the trailing edge of the check and move back into the position shown in Fig. 9. This restores bell crank 202 to its initial position of rest. In the first part of the return movement of fingers 195 toward the initial position, clutch member 280 is disconnected from the driving portion of the clutch to stop the feed of film. As soon as clutch 280 is disengaged, arm 331 stops rotation of the film feed mechanism to prevent the feeding of too much film past the aperture slot in the camera. Then as fingers 195 move almost to the initial position, bell crank 202 is operated sufficiently to disengage contacts 205 and 206 and open the light circuit. The timing of the operation of bell crank 202 in this manner is such that the trailing edge of the document will be leaving the photographic field as the lights are cut off and the film feed is stopped.

The document or check is then fed through the lower feed section of the feeding mechanism of the machine as illustrated in Fig. 9 by feed rolls 75 and idle rolls 133 until it is discharged at the bottom of the periphery of stationary cylinder 66 into tray 143 where it will be delivered to rest face down in the tray. In this manner each succeeding check will be arranged in the tray in the same order as it was fed into the machine with respect to the other checks in a series. Subsequent checks will operate all of the parts of the machine mechanism in the manner above described. The feed of film is controlled by the adjustment of the film feeding mechanism so that there will be only a very small space between the images of adjacent checks or other documents on the film as illustrated in Fig. 38.

When it is desired to photograph statements or other similar documents in the machine, plate 680 as shown in Fig. 1 is swung from the position shown in Fig. 1 so as to close the opening into throat 62. The statements or other documents piled on feed table 61 are then fed by the operator one at a time into the machine below inclined auxiliary table 64 for engagement between the single feed roll 113 at the entrance to the feeding device for the machine for gripping between this roller 113 and its contacting roller 76. The statement is then engaged with the straightening mechanism including fingers 176 so as to be straightened for feeding through the photographing position. The operation of the machine is identical with the feeding of a check as above described, since the leading edge operates each of the controls in the same manner as above described in connection with the feed of a check.

The operation of the camera and the feed mechanism of the machine is maintained continuously during the passage of the statement or other document through the photographing plane until the trailing edge of the statement passes the photographing plane and allows the fingers 195 to return to the normal position shown in Fig. 9 for stopping the film feed and extinguishing the lights. When statements are photographed it is usually desirable to adjust tray 143 so that the forward end thereof as shown in Fig. 1 is moved forwardly to a greater extent so that upon discharge of the statement or other similar document from the feeding mechanism of the camera, the forward edge can engage against the front end of tray 143 while the rear end upon being discharged by the feed mechanism can drop into the rear portion of the tray slightly in advance of the discharge point of the feeding mechanism.

As soon as the film on one spool in the camera is used, the fact that the spool is empty and the film is used will be signaled by the operation of arms 586 and rollers 587 to close the circuit and operate buzzer 600. Film breakage will cause arm 611 to close the circuit to buzzer 600 so that feeding of documents can be stopped until the broken film is repaired and the feeding of the film is re-established in the camera. As soon as the film in the camera has been used, the camera is removed through the opening of cover section 343 which causes the feeding of the lead strip on the end of the film over the film on the receiving spool so that it may be conveniently removed from the camera without having the sensitized portion of the film affected by the light enabling the changing of film spools without a dark room. The spools may, however, be changed in a dark room if convenient in order to eliminate any possibility of the film being affected by light. The camera after being refilled may then be reinserted and the photographing of additional documents continued in a manner as described above.

The document feeding mechanism of the present invention causes the documents to be held in an arcuate shape as they are moved past the photographic field of the camera indicated by the numeral 67. Due to the fact that checks and similar documents may have been folded, wrinkled or buckled before being fed into the camera for photographing, it is difficult to maintain them in a uniform position during feeding into the camera. The shaping of the document into arcuate form during the feeding operation materially aids in maintaining the face of the documents between the sides thereof as it passes through the photographic plane in an equidistant relation with respect to the camera. This is a highly desirable feature due to the fact that with the overall size of the document photographing machine and the percentage of reduction of the image on the film, the optics of the camera lens is such that there is very little depth of focus. By the means employed in feeding documents the face of each document is maintained substantially uniformly in focus with the film to prevent folds, bulges and the like from causing portions of the document to move slightly out of focus and thereby blur the image on the film.

The feeding mechanism also obtains the efficient and rapid feeding of documents for photographing with a series of moving parts having a minimum of weight and inertia components to thereby eliminate the problem of overcoming inertia to start and stop the moving parts of the camera during the feeding and photographing operations.

The convenience of the operator is served to a great extent by the automatic feeding device for the lead strip on the film at the beginning and ending of the photographing operation on one roll of film obtained by the operation of auxiliary cover 343 in the opening and closing movements thereof. In this way the operator does not have to manually operate the machine for this purpose at the beginning and ending of a photographing operation. At the same time the automatic feed definitely feeds an accurate amount of lead strip so as not to waste film.

The documents are also delivered in the front of the machine immediately below feed table 61 in a convenient position for ready removal by the operator. All of the controls and indicating means on the machine for manual operation and observation are also at the front of the machine to provide convenience and facilitate the convenient control and operation of the machine by the operator.

By opening cover 340 at the top of the casing, access is provided to the entire interior structure of the machine so that it can be conveniently inspected and cleaned as well as for the purpose of making adjustments and replacements.

When cover 340 is open, latches 171 may be operated to move the light unit into the inoperative position shown by dot and dash lines in Fig. 2 so that a burned out light bulb 165 may be replaced in a convenient manner. With the light unit moved into this open inoperative position, access is also provided to the feed mechanism for the documents so that the upper guide unit and plate 63 may be swung past the dot and dash line position of Fig. 9 to open position for convenient inspection of all of the parts of the feed mechanism, the cleaning thereof and the making of replacements and adjustments.

The control of solenoid 108 by documents of excessive thickness or double documents and by the auxiliary film feed mechanism prevents careless operators from feeding documents when the machine is not in condition for proper photographing of the documents. Operation of buzzer 600 also serves to warn the operator when the machine is not in condition to photograph documents. It will be understood that the circuit controls for buzzer 600 may also be connected with solenoid 108 when desired in order to fully prevent the feeding of documents except when it may be properly photographed.

Control of solenoid 108 by the auxiliary film feed during its operation prevents the feeding of documents.

Drum 461 of the document indexing mechanism has peripheral movement synchronized with the document feed so that the indicia on the number, date and location units will be photographed in successive order on the film with the documents as shown diagrammatically at 800, 801 and 802 in Fig. 38 respectively, the documents being indicated by numeral 803. The indicia of the units lie in the photographing plane with documents in passing through range 67 in order to secure the result as shown in Fig. 38. Synchronization of document feed and the operation of the document indexing mechanism is obtained by having the drum 461 mounted on shaft 78 which also mounts gear 80 directly driving the feed rolls.

The invention claimed is:

1. In a document photographing machine, a support having a partially cylindrical portion over which documents may be moved into and out of a photographing plane, means mounted on said support for moving documents over said partially cylindrical portion, a rotatable member, indicia displaying means on the periphery of said rotatable member, means mounting said rotatable member in said support with a portion of the periphery in said photographing plane, said rotatable member and partially cylindrical portion being arranged in coaxial relation, and means for operating said document moving means and rotatable member simultaneously for feeding a document through said photographing plane and rotating said member with its periphery traveling at the same speed as the document to expose the indicia thereon in said photographing plane with and adjacent the document.

2. In a document photographing machine, a support having a partially cylindrical portion to define a path of travel for documents, a drive shaft rotatable in said support axially of said cylindrical portion, a drum mounted on said shaft having its periphery coincident with said partially cylindrical portion and in axial alignment therewith, indicia mounted on said drum and exposed on the periphery thereof, means for moving a document about said partially cylindrical portion, and drive means for simultaneously operating said document moving means and said drive shaft to move a document about said partially cylindrical portion at the same speed as the periphery of said drum.

3. In a document photographing machine, a support, document feeding means mounted on said support for moving documents through said machine in a predetermined path, means carrying a plurality of indicia movable on said support to conduct said indicia in a path coincident with said first-mentioned path, means for continuously operating said feeding means and indicia carrying means at a uniform speed to move a document and selected indicia through the respective paths in unison, means operable to stop said means carrying indicia in a predetermined position during continued operation of said operating means, and means operable to change said indicia while it is held in a stationary position.

4. In a document photographing machine, a support, a drum rotatable in said support having an annular flange formed with an aperture, means for normally rotating said drum, a counter mounted on said drum having a plurality of indicator wheels displaying indicia thereon through said aperture, means for stopping rotation of said drum during continued operation of said first-mentioned means with said counter in a predetermined position relative to said support and means on said support for advancing and resetting said indicator wheels while said drum is in said predetermined position.

5. In a document photographing machine, a support, a drum rotatable on said support, means for normally rotating said drum, a plurality of changeable indicia carrying units mounted on said drum for displaying different indicia at a plurality of spaced positions on the periphery of said drum, means selectively operable during continued operation of said first-mentioned means to stop said drum in each of a plurality of predetermined positions corresponding to said units, and means mounted on said support operable to engage a selected unit in its stopped position for operating said unit to change the indicia displayed thereby.

6. In a document photographing machine, a support, a drum rotatable on said support, means for normally rotating said drum, a changeable indicia unit mounted on said drum to display indicia at the periphery thereof, a pawl and ratchet means mounted on said drum and operable for changing said indicia in successive order, an annular actuating member mounted for oscillating movement on said drum and connected for actuating said pawl and ratchet means, means for temporarily stopping rotation of said drum in a predetermined position, and means on said support operable to engage and operate said annular member while said drum is stationary for changing said indicia.

7. In a document photographing machine, a support, a drum rotatable on said support, means normally rotating said drum to move the periphery thereof through a photographing plane at a uniform speed for photographing a changeable indicia unit mounted on said drum to display indicia at the periphery thereof, oscillating means on said drum operable to actuate said indicia unit for progressively advancing said indicia, said indicia unit having resetting means, means for stopping rotation of said drum in a predetermined position, means on said support operable to engage said oscillating means for advancing said indicia, and independent means on said support for engaging and operating said resetting means for resetting said indicia unit.

8. In a document photographing machine, a support, document feeding means mounted in said support, means for operating said document feeding means, a casing enclosing all of said means having a cover removably closing an opening providing access to the interior of said casing, said support being formed to removably receive a camera for photographing documents fed by said document feeding means when positioned in said support, and cover operated means disconnecting said operating means from said document feed means for preventing the feeding of a document during the operation of said cover.

9. In a document photographing machine, a casing having an opening to provide access to the interior thereof, a cover removably mounted on said casing for closing said opening, document feeding means mounted in said casing for conveying documents between inlet and outlet openings formed in said casing, said casing being provided with means for removably supporting a camera therein for photographing documents conveyed through said casing by said feeding means, and cover actuated means for preventing the feed of documents by said feeding means during the operation of said cover in movement between open and closed positions relative to said casing.

10. In a document photographing machine, a casing having an opening to provide access to the interior thereof, a cover mounted on said casing for movement between open and closed positions over said opening, document feeding means mounted in said casing for conveying documents between inlet and outlet openings formed in said casing, and cover actuated means for preventing the feed of documents by said feeding means during the operation of said cover in movement between open and closed positions relative to said casing.

11. In a document photographing machine, a casing having an opening to provide access to the interior thereof, a cover removably mounted on said casing for closing said opening, document feeding means mounted in said casing for conveying documents between inlet and outlet openings formed in said casing, operating means for operating said document feeding means to move documents through said casing, clutch means for controlling the operation of said document feeding means by said operating means, and cover actuated means for operating said clutch means to disengage said operating means from said document feeding means during the operation of said cover in movement between open and closed positions on said casing.

12. In a document photographing machine, a casing, a camera removably mounted in said casing, said casing having an opening therein for the removal of said camera therethrough, a cover mounted for movement on said casing between open and closed positions over said opening, film winding means in said camera, main driving means in said casing, driven means in said casing operated by said main driving means for operating said film winding means during the photographing of documents, automatic means in said casing operable when released for connecting said main driving means with said film winding means independently of said driven means to feed a predetermined length of film in said camera, and cover actuated means for releasing said automatic means for a cycle of operation each time said cover is moved toward open and closed positions on said casing.

13. In a document photographing machine, a camera having film winding means therein, main driving means, clutch means connecting said main driving means with said winding means for feeding film in said camera, auxiliary means for connecting said main driving means with said winding means for feeding film independently of the feed of film through said clutch means, means operated by and during the operation of said auxiliary means for stopping said auxiliary means from feeding film after a predetermined cycle of operation thereof, and means actuated by said last-mentioned means for disengaging said clutch means during operation of said auxiliary means.

14. In a document photographing machine, a camera having film winding means therein, main driving means for normally operating said film winding means, auxiliary means for connecting said main driving means with said film winding means for feeding film independently of the normal feed of film, means operated by and during the operation of said auxiliary means for stopping the operation of said auxiliary means from feeding film after a predetermined cycle of operation thereof, and means for initiating the operation of said auxiliary means.

15. In a document photographing machine, a camera having film winding means therein, a casing for detachably receiving said camera through an opening in one side thereof, a cover movable between open and closed positions to cover the opening in said casing, main driving means within said casing independent of said camera for normally operating said film winding means, auxiliary means for connecting said main driving means with said film winding means for feeding film independently of the normal feed of film by said main driving means, means operated by and during the operation of said auxiliary means for stopping the operation of said auxiliary means from feeding film after a predetermined length of film has been fed thereby, and means operated by said cover for initiating the operation of said auxiliary means.

16. In a document photographing machine, a casing having an opening in one side thereof, a cover movable between open and closed positions for closing said opening in said casing, a camera having film winding means therein detachably mounted in said casing and removable and insertable through said opening when said cover is opened, main driving means in said casing independent of said camera, clutch means connecting main driving means with said winding means for normally feeding film in said camera, auxiliary means for connecting main driving means with said film winding means for feeding film in said camera independently of the feed of film through said clutch means, means operated by and during the operation of said auxiliary means for stopping the operation of said auxiliary means after a predetermined length of film has been fed in said camera, means actuated by said stopping means for disengaging said clutch means during the operation of said auxiliary means, and means actuated by said cover for initiating the operation of said auxiliary means.

17. In a document photographing machine, a casing having an opening in one side thereof, a cover for said opening movable between open and closed positions, means mounted in said casing for detachably mounting a camera therein in a fixed position, film feeding means mounted in said casing for feeding film in a camera when mounted in said fixed position, main driving means for said film feeding means, auxiliary means for independently connecting said main driving means with said film feeding means for feeding film in a camera in said fixed position, means operated by and during the operation of said auxiliary means for stopping the operation of said auxiliary means from feeding film after a predetermined cycle of operation thereof, means actuated by said cover during movement between open and closed positions for initiating operation of said auxiliary means, and means actuated in the operation of the last-mentioned means for disconnecting said film feeding means from said main driving means.

18. An apparatus for handling and copying records comprising a copying machine for photographing records including a camera adapted to contain film, feeding means for feeding records through said copying machine, means operatively connected to said camera for advancing a film therethrough for photographing records fed by said feeding means, a second film-advancing means for advancing a predetermined length of the same film through the camera, means adapted to cause operation of said feeding means and means controlled by said second film-advancing means for rendering said feeding means inoperative while said predetermined length of film is being advanced through the camera.

19. An apparatus for handling and copying records comprising a copying machine for photographing records including a camera adapted to contain film, feeding means for feeding records through said copying machine, indicia carrying means adjacent said feeding means and operated thereby in feeding documents for photographing of indicia simultaneously with documents, illuminating means jointly and simultaneously illuminating documents and adjacent indicia for photographing, means operatively connected to said camera for advancing film therethrough for photographing records and indicia fed by said feeding means and illuminated by said illuminating means, a second film advancing means for advancing a predetermined length of the same film through the camera, means adapted to cause operation of said feeding means, and means controlled by said second film advancing means for rendering said feeding means and indicia carrying means inoperative while said predetermined length of film is being advanced through the camera.

20. An apparatus for handling and copying records comprising a copying machine for photographing records including a camera adapted to contain film, feeding means for feeding records through said copying machine, indicia carrying means contiguous to and connected for operation in unison with said feeding means, means operable to stop said indicia carrying means independently of the operation of said feeding means in a predetermined position for changing the indicia, means operatively connected to said camera for advancing film therethrough for photographing records and indicia fed by said feeding means, a second film advancing means for advancing a predetermined length of film through the camera, means adapted to cause operation of said feeding means, and means controlled by said second film advancing means for rendering said feeding means, indicia carrying means and said means for stopping said indicia carrying means inoperative while said predetermined length of film is being advanced through the camera.

21. In a document photographing machine, a photographing plane, a document feeding means for moving a document through said plane, a movable indicia carrying means having a portion lying and movable in said plane adjacent said document feeding means, a camera adapted to contain film, means operatively connected to said camera for advancing a film therethrough for photographing records and indicia fed through said photographing plane, a second film advancing means for advancing a predetermined length of the same film through said camera, means adapted to cause operation of said feeding means and indicia carrying means to feed documents and indicia through said photographing plane in unison for photographing on said film during passage through said plane, and means controlled by said second film advancing means for rendering said feeding means and indicia carrying means inoperative while said predetermined length of film is being advanced through the camera.

22. In a document photographing machine, a photographing plane, a document feeding means for moving a document through said plane, a movable indicia carrying means having a portion lying and movable in said plane adjacent said document feeding means, a camera adapted to contain film, means operatively connected to said camera for advancing a film therethrough for photographing records and indicia fed through said photographing plane, a second film advancing means for advancing a predetermined length of the same film through said camera, means adapted to cause operation of said feeding means and indicia carrying means to feed documents and indicia through said photographing plane in unison for photographing on said film during passage through said plane, means controlled by said second film advancing means for rendering said feeding means and indicia carrying means inoperative while said predetermined length of film is being advanced through the camera, and document actuated means adjustable for a predetermined document thickness for rendering said feeding means and indicia carrying means inoperative when ever documents exceeding a predetermined thickness are fed into said document feeding means.

23. An apparatus for handling and copying records comprising a copying machine for photographing records including a camera adapted to contain film, feeding means for feeding records through said copying machine, means operatively connected to said camera for advancing a film therethrough for photographing records fed by said feeding means, a second film advancing means for advancing a predetermined length of the same film through the camera, means adapted to cause operation of said feeding means, means controlled by said second film advancing means for rendering said feeding means inoperative while said predetermined length of film is being advanced through the camera, and document actuated means for rendering said feeding means inoperative when documents fed exceed a predetermined thickness.

24. In a document photographing machine, a support, a plurality of coactive rotatable feed rolls mounted on said support defining a path of travel for a document through a photographing plane, a drive shaft mounted in parallel relation to said feed rolls, indicia carrying means movable through said photographing plane at one end in coincident adjacent relation to documents fed by said feed rolls and in coaxial relation to said drive shaft, means on said drive shaft having driving connection with said feed rolls and indicia carrying means for operating both in rotation thereof, a camera adapted to contain film, means operatively connected to said camera for advancing a film therethrough for photographing records in said photographing plane fed by said feed rolls, a second film advancing means for advancing a predetermined length of the same film through the camera, means adapted to cause operation of said drive shaft to feed documents and said indicia carrying means, and means controlled by said second film advancing means for rendering said drive shaft inoperative by said last-mentioned means while said predetermined length of film is being advanced through the camera.

25. In a document photographing machine, as claimed in claim 24, the combination of document actuated control means mounted in said support and associated with said feed rolls and said path of travel in advance of said photographing plane for rendering said drive shaft inoperative by said last-mentioned means when documents in excess of a predetermined thickness are fed to said feed rolls.

RAYMOND M. HESSERT.

REFERENCES CITED

The following references are of record in the file of this patent:

UNITED STATES PATENTS

| Number | Name | Date |
| --- | --- | --- |
| 1,274,831 | Woodward | Aug. 6, 1918 |
| 1,335,894 | Holmes | Apr. 6, 1920 |
| 1,344,896 | Jobke | June 29, 1920 |
| 1,584,296 | Hohmann | May 11, 1926 |
| 1,600,959 | Henderson | Sept. 21, 1926 |
| 1,801,458 | Satterlee | Apr. 21, 1931 |
| 1,826,299 | Chamberlin | Oct. 6, 1931 |
| 1,834,869 | Roe | Dec. 1, 1931 |
| 1,891,335 | Reisinger | Dec. 20, 1932 |
| 1,924,624 | Roesen | Aug. 29, 1933 |
| 1,941,004 | Hessert | Dec. 26, 1933 |
| 1,957,889 | Hopkins et al. | May 8, 1934 |
| 1,966,348 | Hughey | July 10, 1934 |
| 1,987,064 | Hopkins | Jan. 8, 1935 |
| 2,001,598 | Caps et al. | May 14, 1935 |
| 2,005,038 | Holman | June 18, 1935 |
| 2,016,502 | Hutt | Oct. 8, 1935 |
| 2,016,709 | Eichenauer | Oct. 8, 1935 |
| 2,023,921 | Grout | Dec. 10, 1935 |
| 2,062,119 | Bryce | Nov. 24, 1936 |
| 2,099,681 | Draeger | Nov. 23, 1937 |
| 2,115,563 | Tauschek | Apr. 26, 1938 |
| 2,141,119 | Wheeler | Dec. 20, 1938 |
| 2,150,243 | Page | Mar. 14, 1939 |
| 2,161,391 | Schubert | June 6, 1939 |
| 2,177,135 | Fassel | Oct. 24, 1939 |
| 2,196,741 | Schubert | Apr. 9, 1940 |
| 2,251,570 | Hessert | Aug. 5, 1941 |
| 2,258,109 | Carroll | Oct. 7, 1941 |
| 2,291,006 | Stuart | July 28, 1942 |
| 2,292,825 | Dilks | Aug. 11, 1942 |
| 2,304,273 | Nelson | Dec. 8, 1942 |
| 2,357,674 | McConnell | Sept. 5, 1944 |

FOREIGN PATENTS

| Number | Country | Date |
| --- | --- | --- |
| 269,868 | Germany | Feb. 2, 1914 |